United States Patent [19]
Yuen

[11] Patent Number: 5,659,367
[45] Date of Patent: Aug. 19, 1997

[54] TELEVISION ON/OFF DETECTOR FOR USE IN A VIDEO CASSETTE RECORDER

[75] Inventor: Henry C. Yuen, Redondo Beach, Calif.

[73] Assignee: Index Systems, Inc., Virgin Islands (Br.)

[21] Appl. No.: 368,340

[22] Filed: Dec. 30, 1994

[51] Int. Cl.⁶ .................. H04N 7/00; H04N 5/76; H04B 1/18
[52] U.S. Cl. .................. 348/465; 348/468; 348/731; 386/83; 455/6.1; 455/179.1; 455/186.1
[58] Field of Search ........................ 358/335, 310; 360/33.1, 69; 348/731, 732, 734, 468, 465, 563, 564, 569; 455/179.1, 181.1, 6.1, 185.1, 186.1; 386/1, 46, 83; H04N 5/76, 5/92, 5/91, 1/00, 11/00

[56] References Cited

U.S. PATENT DOCUMENTS

| | | | |
|---|---|---|---|
| 4,025,851 | 5/1977 | Hasselwood et al. | 325/31 |
| 4,641,205 | 2/1987 | Beyers, Jr. | 360/33.1 |
| 4,706,121 | 11/1987 | Young | 358/142 |
| 4,866,434 | 9/1989 | Keenan | 340/825.72 |
| 4,908,713 | 3/1990 | Levine | 358/335 |
| 4,977,455 | 12/1990 | Young | 358/335 |
| 5,253,120 | 10/1993 | Endoh | 360/19.1 |
| 5,296,932 | 3/1994 | Long | 348/731 |
| 5,335,079 | 8/1994 | Yuen et al. | 358/335 |
| 5,335,277 | 8/1994 | Harvey et al. | 380/20 |
| 5,343,251 | 8/1994 | Nafeh | 358/335 |
| 5,390,027 | 2/1995 | Henmi et al. | 358/335 |
| 5,508,815 | 4/1996 | Levine | 358/335 |
| 5,532,732 | 7/1996 | Yuen et al. | 358/335 |

FOREIGN PATENT DOCUMENTS

| | | | |
|---|---|---|---|
| 0208931 | 1/1987 | European Pat. Off. | H04N 5/782 |
| 0393955 | 10/1990 | European Pat. Off. | G11B 27/34 |

*Primary Examiner*—Thai Tran
*Attorney, Agent, or Firm*—Christie, Parker & Hale, LLP

[57] ABSTRACT

An apparatus for providing a television guide includes a device for detecting whether a television is off, a device for switching a signal output from a first television signal source to a second television signal source, if television guide data is not contained in the signal output from the first television signal source when the device for detecting detects that the television is off, a device for extracting the television guide data from the signal output when the device for detecting detects that the television is off, and memory for storing the extracted television guide data. In another embodiment an apparatus for providing a directory for transmitted and recorded programs, includes a device for detecting whether a television is off, a device for switching a signal output from a first television signal source to a second television signal source, if a directory is not contained in the signal output from the first television signal source when the device for detecting detects that the television is off, a device for extracting the directory from the signal output when the device for detecting detects that the television is off, a recorder for recording the transmitted programs, and a memory for storing the extracted directory.

10 Claims, 34 Drawing Sheets

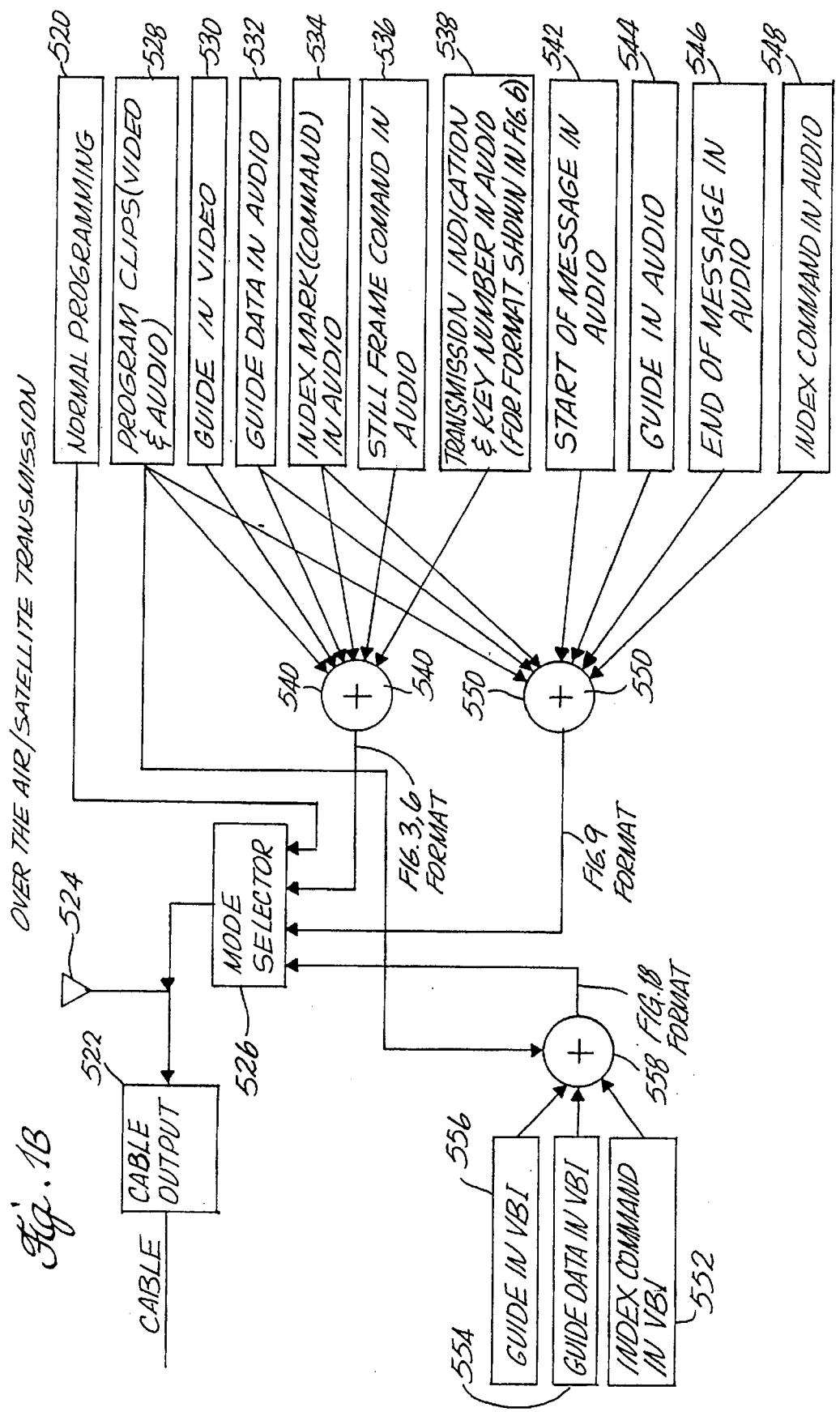

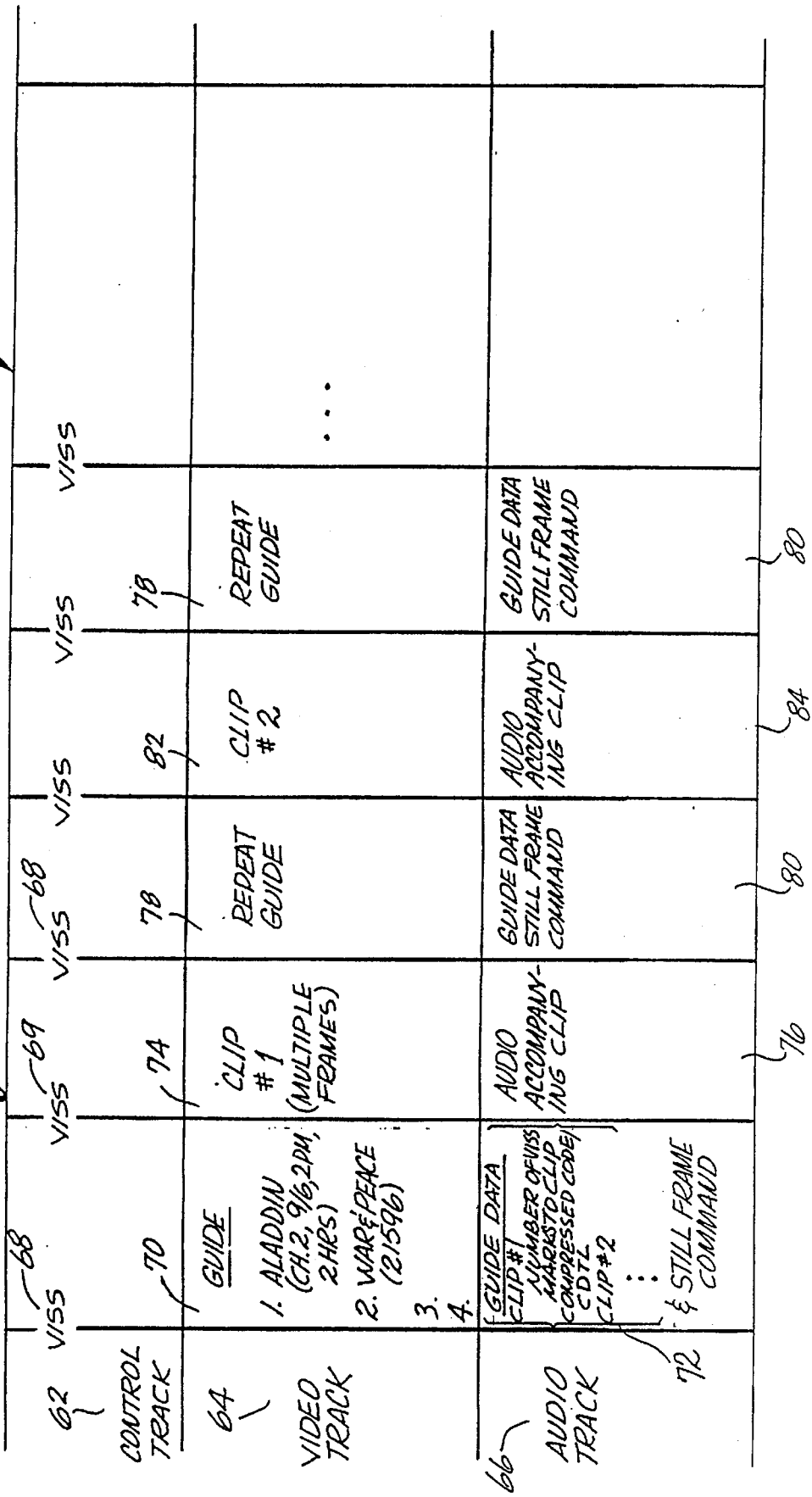

GUIDE

| | TITLE | MIN |
|---|---|---|
| 1. | WHEEL OF FORTUNE | 30 |
| 2. * | ENTERTAINMENT TONITE | 30 |
| 3. | MURPHY BROWN (CH2, 10/17, 1PM)(5941) | 30 |
| 4. | TERMINATOR | 90 |
| 5. | END | 60 |

HIGHLIGHT SELECTION

Fig. 12

TPA PACKET INFORMATION IN VBI LINES

D(N) INFORMATION IN VBI LINES

TELEVISION ON/OFF DETECTOR FOR USE IN A VIDEO CASSETTE RECORDER

FIELD OF THE INVENTION

This invention relates generally to electronic guides and particularly to television guides, such as television program schedule guides. This invention also relates to a television guide with video clips.

BACKGROUND OF THE INVENTION

Program guides that can be used to select programs for viewing or recording are commonly available in newspapers. An on-screen television guide is desirable so that a viewer can access the guide directly without consulting another media. It is desirable that apparatus and methods be provided to ensure that guide data for an on-screen television guide is always available.

Previews of upcoming movies or television programs and infomercials are commonly shown to generate interest in them. One technique is to show clips of the video before or after the full presentation of another program. This is done both for television programs or movies to be shown on television. Increasingly common is the inclusion of video clips of other movies on a rented video cassette tape. The renter of the video cassette tape rents the tape to watch a particular movie, but also can watch the previews, which are put onto the otherwise unused tape in the video cassette. A problem with this conventional technique is that the viewer must watch the entire tape to ascertain which previews are present.

A more convenient means of providing video clips is needed. Also it is desirable to provide a method of linking the video clips to a television guide for programs to be broadcast.

SUMMARY OF THE INVENTION

An object of the present invention is to provide a capability for extracting a television guide from a television signal. Another object of the invention is to allow the access of a television guide from a television signal even if the channel and television signal source are unknown.

Another object of the present invention is to provide a capability for searching various channels within a television signal source to find a channel containing television guide data. Another objection of the present invention is to provide an apparatus that can be programmed to search for a television guide at only certain times. Another object of the present invention is to provide an apparatus that searches for television guide data in alternate television signal sources.

Another object of the invention is to search channels and/or television signal sources for a television guide, only if the television is OFF, in order to not interrupt television viewing.

Another object of the present invention is to provide a directory to programs which are recorded by a VCR when the programs are transmitted via cable, satellite, or over the air.

According to the present invention, apparatus and methods are provided for a television guide. In one embodiment the apparatus includes a device for comparing a current time with at least one stored time period to determine if the current time is within the stored time period, a device for switching a signal output from a first television signal source to a second television signal source, if television guide data is not contained in the signal output from the first television signal source when the current time is within the stored time period, a device for extracting the television guide data from the signal output when the current time is within the stored time period, and a memory for storing the extracted television guide data.

In another embodiment the apparatus includes a device for controlling a tuner to tune to a plurality of channels in the first television signal source, when the current time is within the stored time period, a device for controlling a tuner to tune to a plurality of channels in the second television signal source, when the current timer is within the stored time period, and a device for locking the tuner on a channel containing television guide data in order to permit extraction of the television guide data from the channel, wherein the device for switching switches from the first television signal source to the second television signal source, if television guide data is not contained in the signal output from the plurality of channels in the first television signal source.

In another embodiment an apparatus for providing a television guide includes a device for detecting whether a television is off, a device for switching a signal output from a first television signal source to a second television signal source, if television guide data is not contained in the signal output from the first television signal source when the device for detecting detects that the television is off, a device for extracting the television guide data from the signal output when the device for detecting detects that the television is off, and memory for storing the extracted television guide data.

In yet another embodiment an apparatus for providing a directory for transmitted and recorded programs, includes a device for detecting whether a television is off, a device for switching a signal output from a first television signal source to a second television signal source, if a directory is not contained in the signal output from the first television signal source when the device for detecting detects that the television is off, a device for extracting the directory from the signal output when the device for detecting detects that the television is off, a recorder for recording the transmitted programs, and a memory for storing the extracted directory.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 1B is a block diagram of the transmission system according to the present invention;

FIG. 3 is a drawing showing a tape layout having a television guide with video clips according to the present invention;

FIG. 12 is a display of a television guide on a television monitor according to the present invention;

DETAILED DESCRIPTION

Figure 1A:
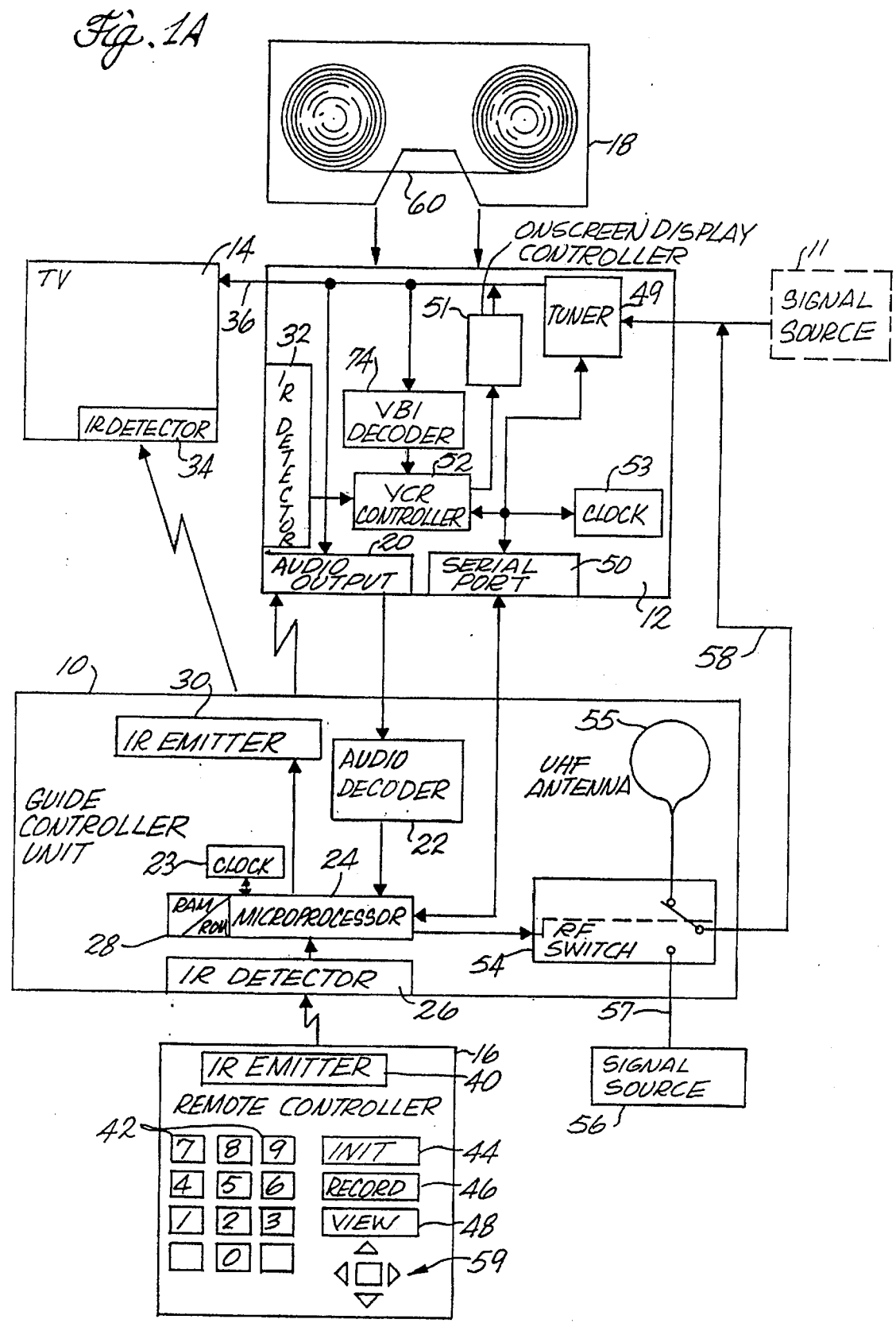
FIG. 1A is a schematic showing apparatus for a television guide according to the present invention.

Referring to the drawings, a guide controller unit 10 is shown in FIG. 1A. The guide controller unit 10 is coupled to the VCR audio output 20 and the serial port 50 of the video cassette recorder 12. When a video cassette tape 18 is played in the video cassette recorder 12, the program recorded on the tape can be viewed on television 14, which receives the television signal on line 36. The video cassette tape 18 may be a prerecorded tape, or can be created by recording on the video cassette recorder 12 the signals from signal source 11 or from line 58 from the guide controller unit 10, as will be explained. The signal source 11 can include sources such as a television antenna, a television cable, or a satellite receiver, and in some embodiments line 58 is not present so signal source 11 is the only signal source. If the line 58 is present, then signal source 11 is not used and the line 58 is coupled via RF switch 54 to either UHF antenna 55 or to signal source 56. The signal source 56 can include sources such as a television antenna, a television cable, or a satellite receiver.

The VCR 12 includes a tuner 49, an on-screen display controller 51, a VCR controller 52, a clock 53 having an output that is a function of time, an audio output 20, a serial port 50, and a vertical blanking interval (VBI) line decoder 74. The VCR controller 52 can be implemented with a microprocessor or logic to control the VCR and communicates to the tuner 49, the on-screen display controller 51, the clock 53 having an output that is a function of time, the serial port 50, the vertical blanking interval (VBI) line decoder 74 and an infrared detector 32. The audio output is coupled to tuner 49.

The guide controller unit 10 has an audio decoder 22 which is connected to VCR audio output 20, a microprocessor 24 with a memory 28, a clock 23 having an output that is a function of time, an infrared emitter 30, and an infrared detector 26. As shown in FIG. 1A, the microprocessor 24 communicates with audio decoder 22, clock 23, infrared emitter 30, infrared detector 26 and memory 28. The microprocessor 24 also communicates to serial port 50 in VCR 12, and to RF switch 54, which is coupled to the UHF antenna 55 and the signal source 56.

The remote controller 16 communicates with guide controller unit 10 and has number keys 42, an initialization key 44, a record key 46, a view key 48, and a cursor controller 59, the operation of which are explained further below. The remote controller 16 has an infrared emitter 40 that can communicate to infrared detector 26 on guide controller unit 10.

The infrared emitter 30 on guide controller unit 10 communicates with both the infrared detector 32 on video cassette recorder 12 and the infrared detector 34 on television 14. The remote controller 16 does not operate the video cassette recorder 12 or television 14 directly. The remote controller 16 communicates with guide controller unit 10 and the guide controller unit 10 controls the video cassette recorder 12 and television 14 through the emissions of infrared emitter 30 to the infrared detector 32 and the infrared detector 34.

The television 14 is assumed to have a mute control feature for turning off the sound of the television upon command. The video cassette recorder 12 is assumed to have the following features: play, rewind, record, stop, index, index mark, and still frame.

FIG. 1B is a block diagram of the transmission system for transmitting a guide according to the present invention. The transmission system includes a cable output 522, means 524 for over the air or satellite transmission and a means for selecting a mode of transmission 526. In one mode normal programming 520 is transmitted. In another mode the elements 528, 530, 532, 534, and 536, as described in FIG. 1B, are combined in combiner 540 to transmit guide and guide data with video clips, which can be recorded on a tape in the format shown in FIG. 3. In another mode the elements 528, 530, 532, 534, 536 and 538, as described in FIG. 1B, are combined in combiner 540 to transmit guide and guide data with video clips, which can be recorded on a tape in the format shown in FIG. 6. In yet another mode the elements 528, 532, 534, 542, 544, 546 and 548, as described in FIG. 1B, are combined in combiner 550 to transmit guide and guide data with video clips, which can be recorded on a tape in the format shown in FIG. 9. In still another mode the elements 528, 552, 554, and 556, as described in FIG. 1B, are combined in combiner 558 to transmit guide and guide data with video clips, which can be recorded on a tape in the format shown in FIG. 18. The order of transmitting the elements in the modes is explained below in the discussions relative to FIGS. 3, 6, 9 and 18.

Figure 2A:
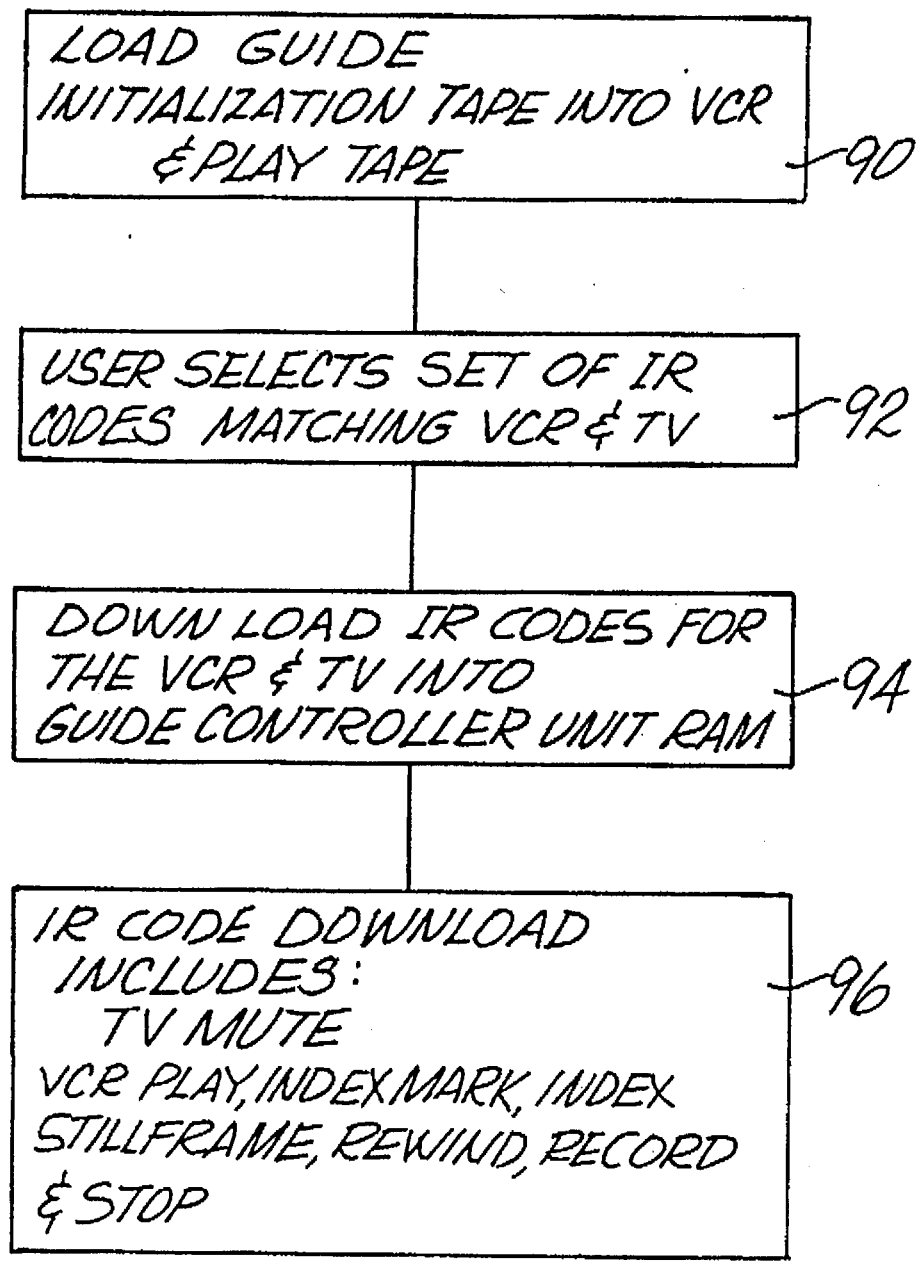
FIG. 2A is a flow graph of steps for initializing the apparatus for a television guide according to the present invention.

FIG. 2A is a flow graph of steps for initializing the apparatus of FIG. 1 for a television guide with video clips according to the present invention. A special initialization tape is loaded into the video cassette recorder 12 in step 90 and the initialization tape is played. The initialization tape has encoded in its audio track the infrared code libraries for substantially all types of VCRs and televisions. When the tape is played, video cues are displayed on the television 14 to enable the user to locate the codes for the particular type of television and VCR in use. Then the infrared codes for the user's VCR and television are downloaded into memory 28 via VCR audio output 20. The audio decoder 22 decodes the audio output signal and the microprocessor 24 stores the infrared codes into memory 28. Alternately the infrared codes for the televisions and VCRs can be stored in ROM in memory 28 and the user is provided a method of selecting the proper subset of infrared codes to match the particular television and VCR in use. The codes can also be used to send commands to the VCR 12 via the serial port 50. Once the infrared codes have been loaded into the memory 28 of the guide controller unit 10 the user can play a video cassette tape 18 with a television guide with video clips.

Referring to FIG. 2A, the initialization sequence for the guide controller unit 10 is to first load the initialization tape into the VCR and play the initialization tape in step 90. Then the user selects a set of infrared codes matching his particular VCR and television in step 92. Then in step 94 the infrared codes are downloaded from video cassette recorder 12 via VCR audio output 20 and audio decoder 22 into memory 28. The downloaded infrared codes include codes for television mute, VCR play, VCR rewind, VCR record, VCR stop, VCR index, VCR index mark, and VCR still frame, as shown in step 96.

Figure 2B:
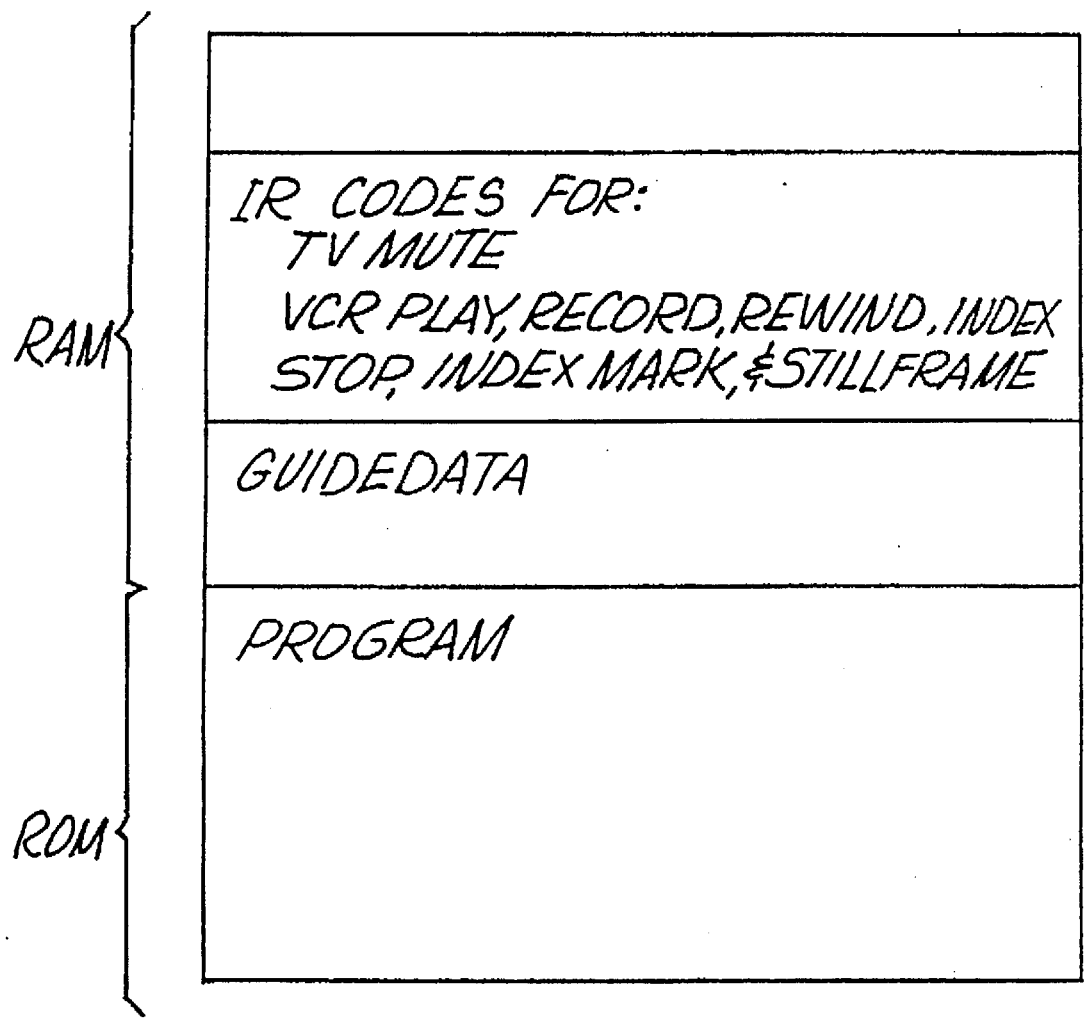
FIG. 2B is a design of the random access memory and the read only memory of the apparatus for a television guide according to the present invention.

FIG. 2B is a diagram of the contents of memory 28 including a read only memory portion for storing a program and random access memory portion for storing the infrared codes for the television and the VCR.

FIG. 3 is a drawing showing a tape layout having a television guide with video clips according to the present invention. The tape 60 has a control track 62, a video track 64 and an audio track 66. As shown in FIG. 3, the first length of the tape has a VISS mark 68 in the control track 62. Second VISS mark 69 is also in control track 62. Between VISS mark 68 and VISS mark 69 a guide 70 is in the video track 64. As shown in FIG. 3, the guide 70 consists of an index to video clips on the tape. For example, the first video clip is Aladdin, which will be shown on channel 2 on September 6th at 2:00 p.m. and has a length of two hours. The second video clip is War and Peace, which has a compressed code of 21596.

The compressed code is encoded CDTL information and compressed codes and their use are more fully explained in U.S. Pat. No. 5,335,079 issued Aug. 2, 1994, which is incorporated herein by this reference, as though set forth in full. The compressed codes each have at least one digit representative of, and compressed in length from, the combination of the channel, day, time-of-day, and length and can be decoded into channel, day, time-of-day, and length.

In audio track 66, guide data associated with the guide is encoded as audio tones. The guide data 72 includes for each video clip on the guide 70, the number of VISS marks from the guide to the respective video clip. The channel, day, time-of-day and length (CDTL) or another program identifier can be encoded as tones within the guide data for each video clip. Also, a compressed code compressed in length from the CDTL and containing the information of the CDTL associated with the video clip can be encoded as tones within the guide data 72. At the end of the guide data is a still frame command, which is encoded as tones in the audio track 66.

In a second length of the tape following the guide and the guide data, the first video clip is located with the video for the clip written in the video track 64 and the audio that accompanies the video written within the audio track 66. A VISS mark 69 is written at the beginning of the video clip in control track 62 and a VISS mark 68 is also written at the end of the video clip in control track 62.

Following the video clip, the guide is repeated in video track 64, as shown by guide 78 in FIG. 3 and guide data 80 is written into audio track 66. The guide data 80 is not the same as the guide data 72, because the number of VISS marks to a video clip from guide data 80 is different from the number of VISS marks to a video clip from guide data 72.

As shown in FIG. 3 the second video clip follows guide 78 and the audio 84 accompanying the second video clip is written in audio track 66. The pattern of repeating the guide and guide data after each video clip is repeated across the tape. As the tape is played on video cassette recorder 12 the guide is displayed on television 14 and the guide data is sent via VCR audio output 20 and audio decoder 22 to microprocessor 24. At the end of the guide data is a still frame command. When this is decoded by audio decoder 22 the microprocessor 24 sends a still frame command via infrared emitter 30 and infrared detector 32 to video cassette recorder 12. The guide is then displayed as a frozen frame on television 14. To access a video clip the user pushes one of the number keys 42 and then pushes view key 48. For example, pushing key number 3 and the view key will access the third video clip listed in the guide. The guide controller unit 10 sends index commands to video cassette recorder 12 via infrared emitter 30 and infrared detector 32 to advance or rewind the tape to the video clip selected by the user. This is accomplished by guide controller unit 10 by processing the decoded guide data to determine the number of VISS marks forward or backward on the tape to the video clip selected by the user. Then the guide controller unit 10 via infrared emitter 30 and infrared detector 32 commands the video cassette recorder 12 to advance or rewind by the number of VISS marks to the selected video clip.

Figure 4:
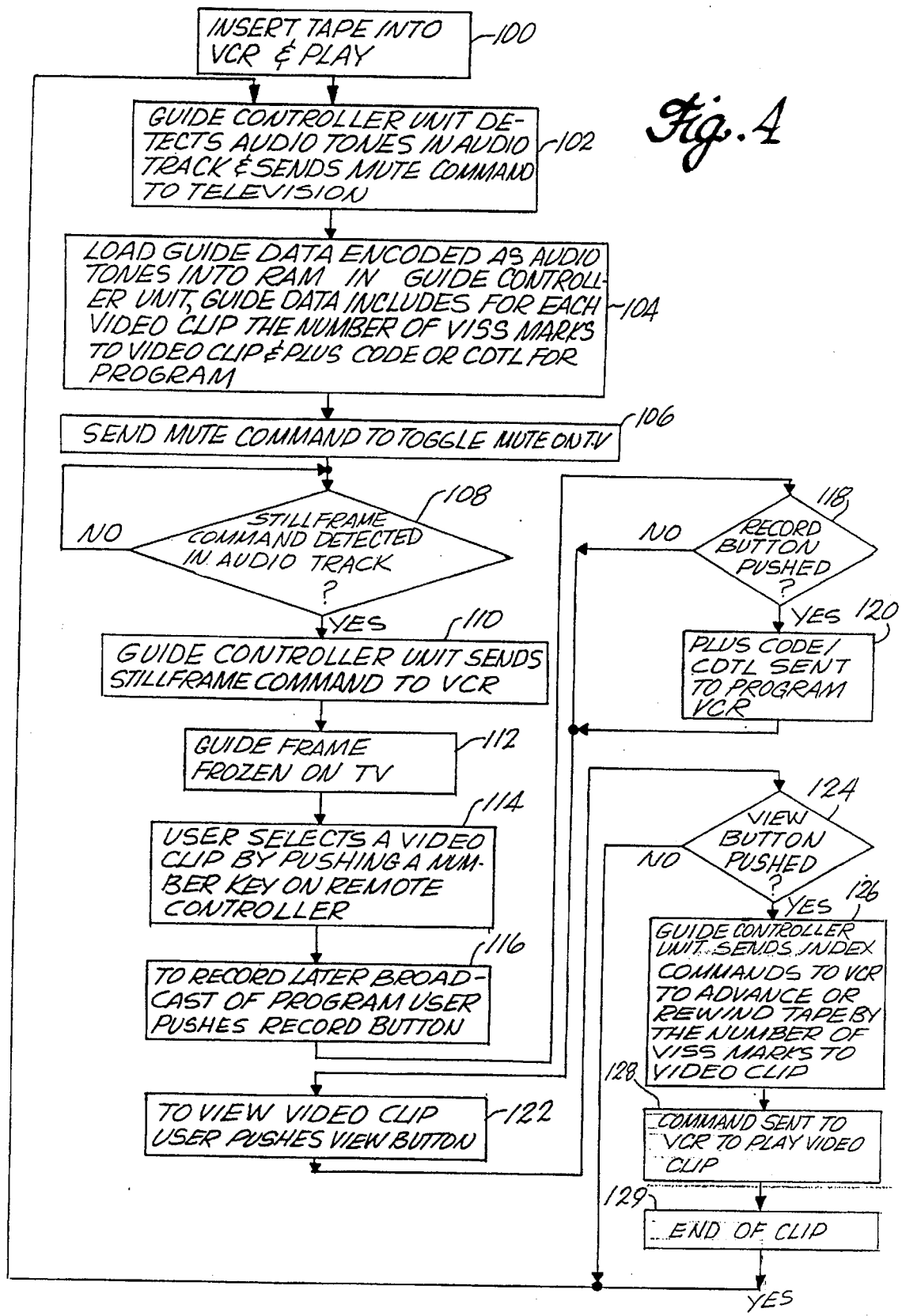
FIG. 4 is a flow graph of steps for using the apparatus for a television guide with video clips according to the present invention.

The steps for using the apparatus for a television guide with video clips according to the present invention is further described in FIG. 4. In step 100, a tape 18 with a television guide with video clips, such as shown in FIG. 3, is inserted into video cassette recorder 12 and the video cassette recorder 12 is commanded to play the tape. In step 102 the guide controller unit 10 decodes the audio tones in the tape audio track, which are sent to guide controller unit 10 via VCR audio output 20 to audio decoder 22. Upon determining the audio tones are being received the guide controller unit 10 sends a mute command to television 14. Sending the mute command avoids the annoyance the audio tones would otherwise cause to a listener. Then in step 104 the guide data is loaded into the RAM portion of memory 28. As explained before, the guide data includes for each movie clip on the tape the number of VISS marks to the video clip and optionally encoded CDTL information in a compressed code, or channel, day, time-of-day and length for a program that corresponds to the video clip. After the audio data has been stored in memory 28, the mute command may be sent again to television 14 via infrared emitter 30 and infrared detector 34 to toggle the mute switch on television 14 and turn the sound back on. Then in step 108 the guide controller unit 10 searches for a still frame command in the audio tones being sent via VCR audio output 20 to audio decoder 22 in guide controller unit 10. If a still frame command is detected in the audio track then the guide controller unit 10 sends a still frame command to video cassette recorder 12 thereby freezing the current frame being transmitted to the television from the VCR. In step 112 the guide is frozen on television 14. In step 114 the user selects a video clip to view or record by pushing a number key 42 on remote controller 16. For example, for the guide shown in FIG. 3, if the user wants to view the video clip for War and Peace, then the user would push the number key 2 and then the view button 48. After pushing the number for the selected video clip, the user may also select to record the later transmission of the program by pushing the record button 46 on remote controller 16, as shown in step 116. If the record button is pushed, as determined in step 118 then the compressed code or the CDTL information for the selected video clip is sent to video cassette recorder 12 to program the VCR. The compressed codes are compressed from the combination of channel, day, time-of-day and length for a program and are now commonly published in newspapers to assist in the recording of programs on VCRs.

To view the selected video clip the user pushes view button 48, as shown in step 112 of FIG. 4. If the view button has been pushed as determined by step 124, then in step 126 the guide controller unit 10 sends index commands to video cassette recorder 12 to advance or rewind the tape by the number of VISS marks to the selected video clip. Then in step 128 a command is sent to video cassette recorder 12 to play the selected video clip. At the end of the video clip (step 129) the guide controller unit 10 again detects audio tones in audio track 66 and sends a mute command to the television as shown in step 102. Then steps 104, 106, 108, 110 and 112 are repeated and the user can select another video clip to view or to record. The first time the guide is displayed to the user, the user will most likely select to view a video clip by performing steps 114 and 122 and then the next time the guide is displayed to the user, the user having seen the video clip could decide to record the program when it is transmitted at a later time by performing steps 114 and 116. However, it is possible for the user to select to record a program before viewing the video clip for the program.

In the description so far it has been assumed that the user is provided with a video cassette tape with a television guide with video clips. Another embodiment of the invention is to transmit the television guide with video clips rather than to provide it directly on a video cassette tape. A number of issues arise when the television guide with video clips is transmitted rather than delivered on a video cassette tape. The first is that with a video cassette tape the user can be charged either a sales fee or a rental fee for the video cassette tape. In the case of a transmission other provisions have to be made in order to charge the user for the television guide with video clips. The television guide with video clips can be transmitted on a channel at a time when the cost of transmission is low. During the transmission the guide controller unit 10 must be turned off during the receipt of the transmission, so that the operations described in FIG. 4 are not executed. For example, if during the transmission the guide controller unit 10 is turned on, then still frame commands detected in the transmission would result in a still frame command to the VCR. This would stop the recording of the transmission. One way to ensure that the guide controller unit is off, is to automatically turn off the guide controller unit at a certain time at night, when the transmission is scheduled, as shown in step 144. One method to implement turning off the guide control unit is to program the microprocessor to ignore all received information when the time on clock 23 is between certain times, such as between 3 a.m. and 3:30 a.m. In step 146 of FIG. 5 the transmission is recorded on tape by the video cassette recorder 12.

After the transmission is complete the tape is rewound in step 148 and the guide controller unit 10 is turned on. Then to use the tape in the manner described in FIG. 4 the tape must be initialized. In step 150 the user pushes INIT key 44 on remote controller 16. One method of obtaining revenue for the use of the television guide with video clip transmission is to have the user call a 900 number to obtain a key number as shown in step 152. The user then enters the key number on remote controller 16 as shown in step 154. In step 156 the entered key number is sent to guide controller unit 10 from remote controller 16. Then in step 158 guide controller unit 10 sends a play command to video cassette recorder 12. At the beginning of the tape a key number has been received and recorded from the transmission into the tape audio track. In step 160 the key number transmitted and recorded on tape is sent via the VCR audio output 20 to audio decoder 22 in guide controller unit 10 and compared to the key number that was entered on remote controller 16. If in step 163 it is determined that the entered key numbers and the transmitted key numbers do not compare, then in step 164 the operation of the guide controller unit 10 is aborted which prevents the guide controller unit 10 from operating properly to allow access of the video clips that are recorded on the tape. If the numbers do compare, then the tape will be initialized. In the transmission VISS marks are not transmitted so the recorded tape at this point in the process has no VISS marks written on the tape. However, the transmission does have audio tones in the audio track that are placed in the audio track at the location that a VISS mark should be located in the control track. These audio tones are encoded to represent an index mark. When an index mark audio tone is detected in audio decoder 22, then the guide controller unit 10 sends an index mark command to the video cassette recorder 12 and a VISS mark is written on the tape in the control track. This completes the initialization of the tape which can then be rewound and used in the manner described in FIG. 4.

Figure 5:
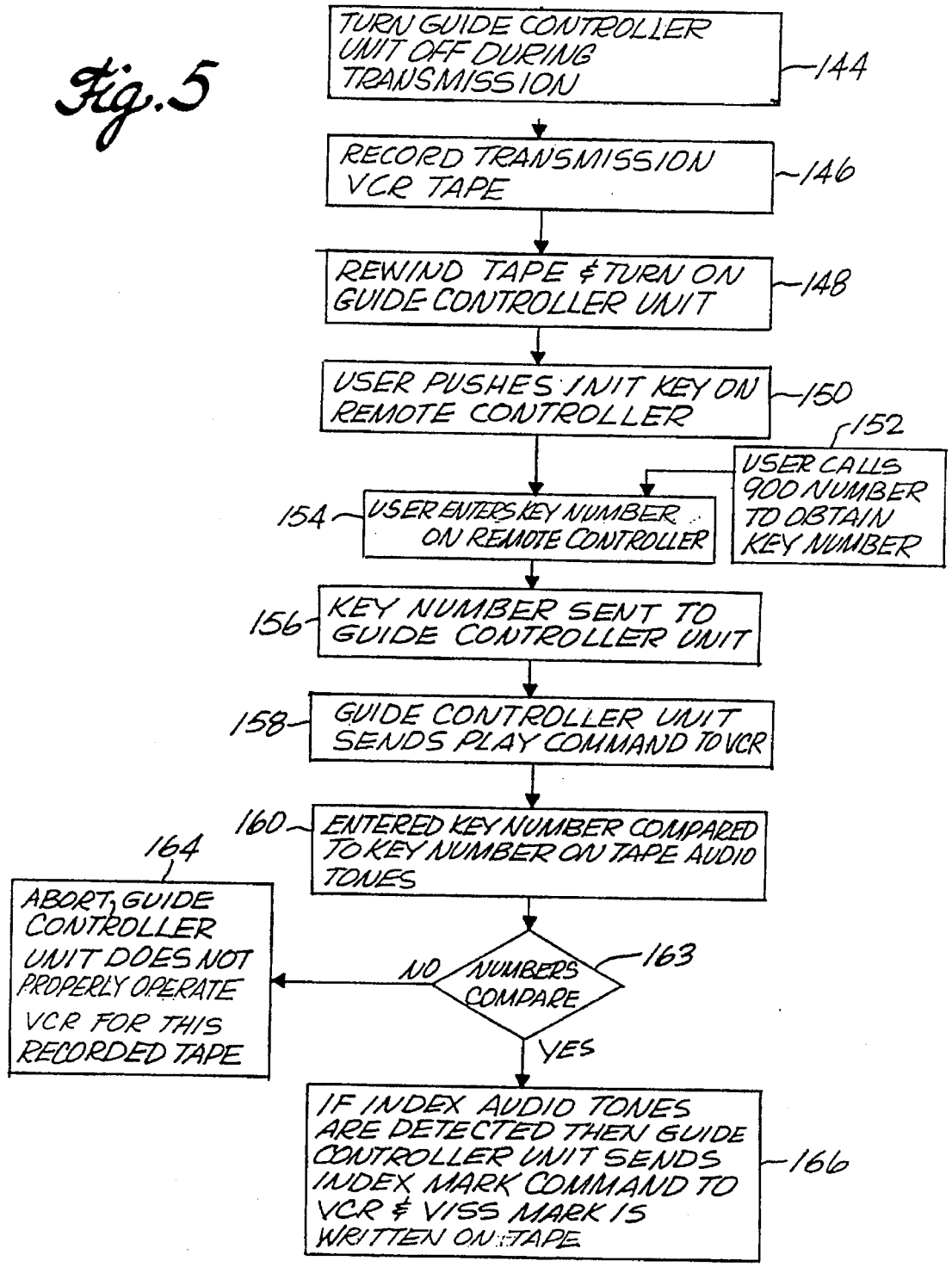
FIG. 5 is a flow graph of steps for using the apparatus for a transmitted television guide with video clips according to the present invention.
Figure 6:
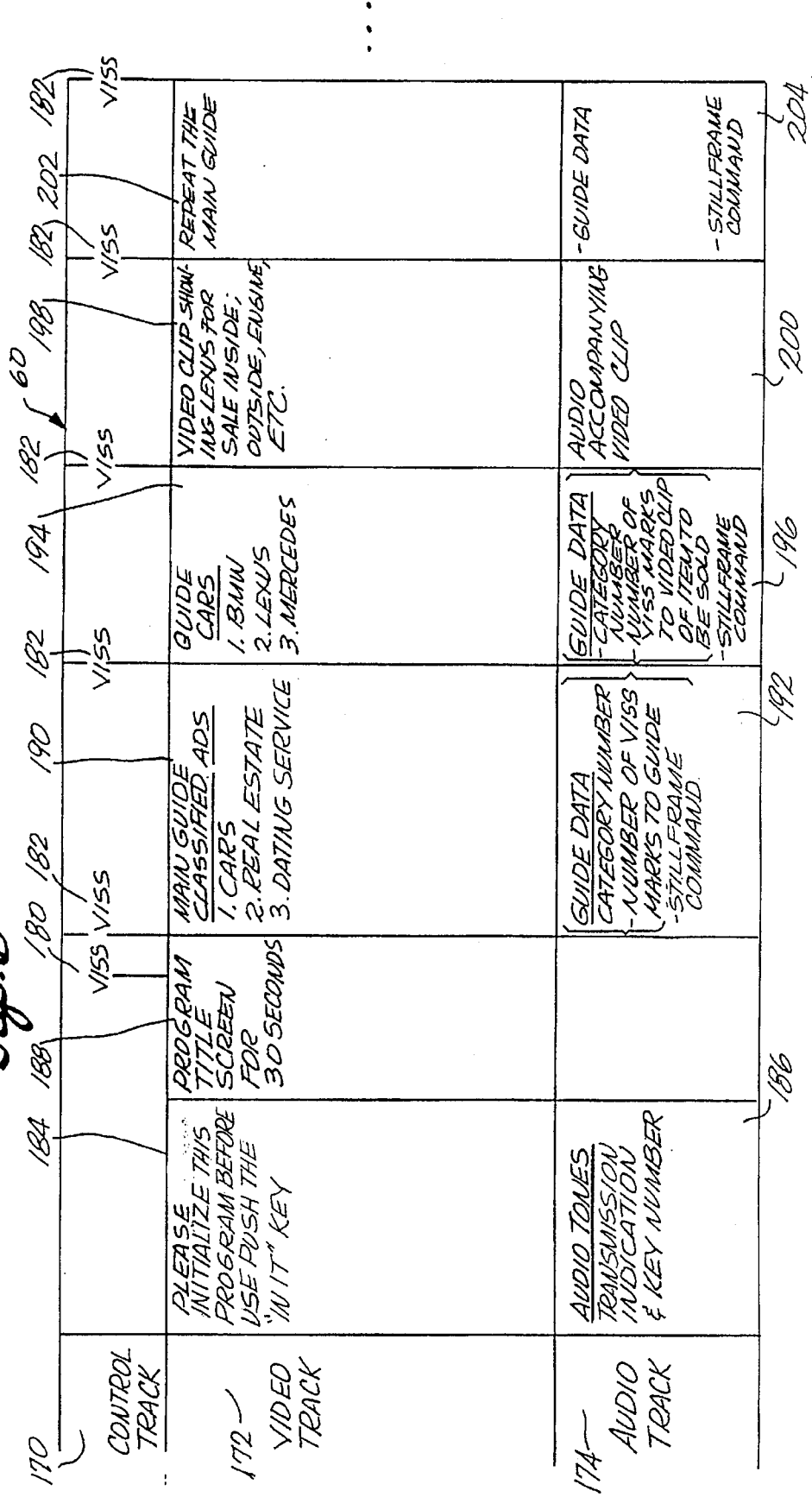
FIG. 6 is a drawing showing a tape layout having a television guide with video clips according to the present invention.

The method described in FIG. 5 is somewhat inconvenient because the guide controller unit 10 must be turned off during the transmission. FIG. 6 illustrates a tape recording of a transmitted television guide with video clips. In the recorded video track there is a message at the beginning of the transmission which indicates to the user to push the INIT key 44 in order to initialize the tape for use. In the audio track of the recorded tape in position 186 there are audio tones encoded to provide a transmission indication and also audio tones encoded to signify a key number. Following sections 184 and 186 of the recording is a title screen 188 which has a length of about thirty seconds. Following the title screen is a guide 190. Corresponding to guide 190 is the guide data 192 in the audio track 174.

FIG. 6 illustrates using a television guide with video clips for infomercials. The main guide 190 is an index to categories of infomercials and then each category has its own guide. For example, the guide for the cars selection in the main guide 190 is guide 194 which has a list of further selections for BMW, LEXUS and Mercedes. The guide data 192 stores the number of VISS marks to another guide, for example, guide 194. Each guide has a corresponding guide data in the audio track and at the end of the guide data is a still frame command. The still frame command freezes the guide on the television, which allows the viewer to select one of the items listed in the guide. The guide data has the number of VISS marks to the video clips corresponding the items listed in the guide. A video 198 showing data for a LEXUS has video 198 in the video track 172 and audio 200 in the audio track 174. After each video clip the main guide is repeated. Guide data corresponding to the main guide accompanies the guide in the audio track 174; however, the guide data on a repeated main guide such as guide data 204 is not the same as guide data 192, because the number of VISS marks to a selected entry is different for guide data 204 and guide data 192. If the infomercial format of FIG. 6 is not transmitted but is provided directly on tape, then the tape would not have the initialize message 184 and would not have the transmission indication and the key number 186.

The VISS marks as shown in FIG. 6 are not present in the transmission. So it is again necessary to insert the VISS marks into the control track of a tape that records the transmission. FIG. 5 illustrates one method of inserting the VISS marks into the recorded tape which has been described; however, in FIG. 5 it was necessary to turn off the guide controller unit 10 in step 144.

Figure 7:
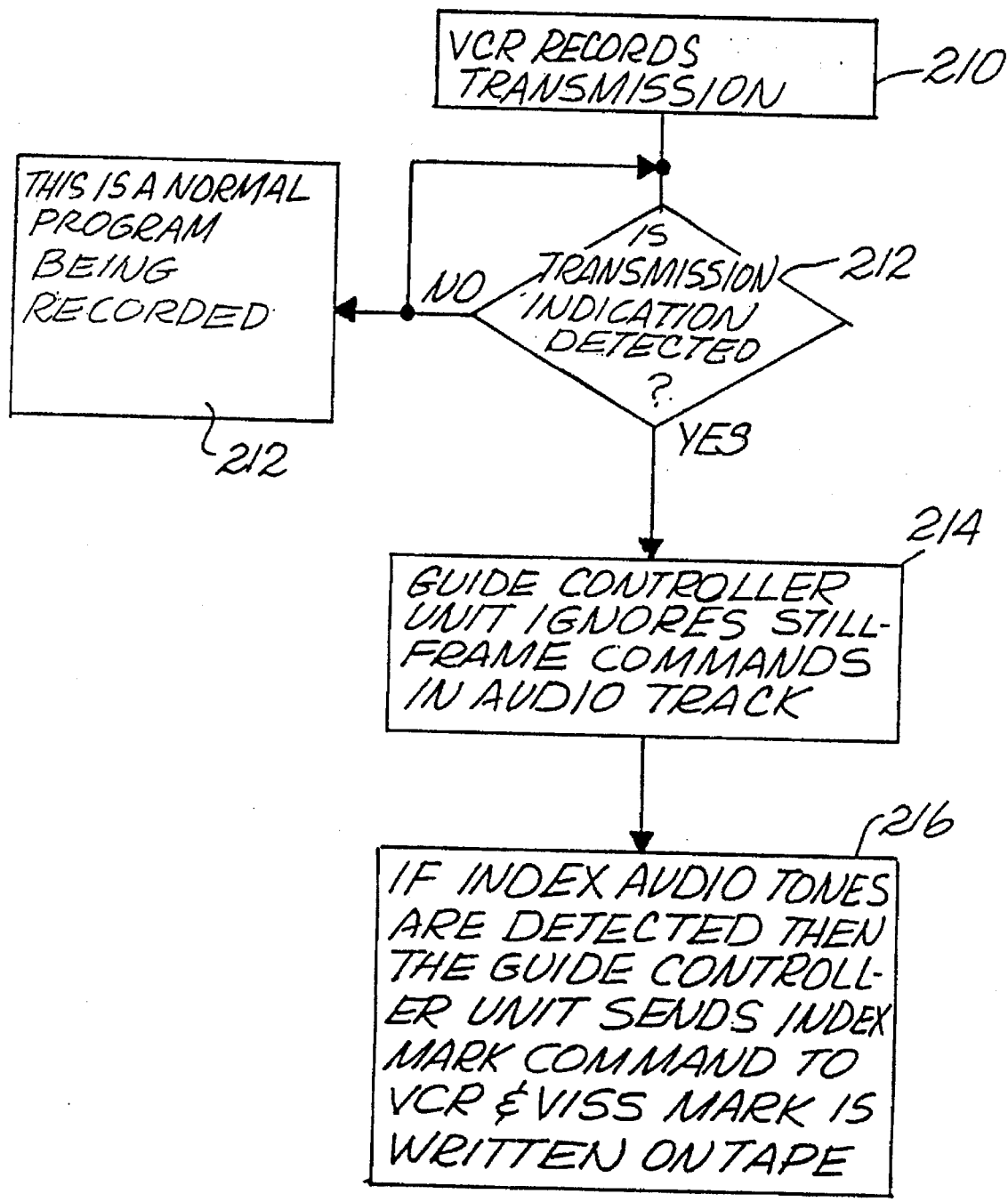
FIG. 7 is a flow graph of steps for initializing a television guide with VISS marks during a transmission and recording of a television guide with video clips according to the present invention.

FIG. 7 shows an alternate way to insert VISS marks onto the tape that is recording the transmitted television guide with video clips. In step 210 the VCR has been commanded to record a transmission. As the VCR records the transmission the audio track of the transmission is sent via VCR audio output 20 to the audio decoder 22 in the guide controller unit 10. Step 212 determines whether a transmission indication has been detected in the audio tones. If the transmission indication is not detected then this is just a normal program being recorded as indicated in step 212. If a transmission indication is detected then the guide controller unit 10 ignores any still frame commands that are in the audio track and decoded by step 22. Index audio tones are transmitted in the transmission at the locations where VISS marks are required to be written in the control track. In step 216 if index audio tones are received from the audio output 20 and decoded by audio decoder 22 then the guide plus unit 10 sends a index mark command to the video cassette recorder 12 which writes a VISS mark onto the control track of the tape. One advantage of this technique is that the VISS marks are written onto the tape during the transmission of the television guide with video clips.

Figure 8:
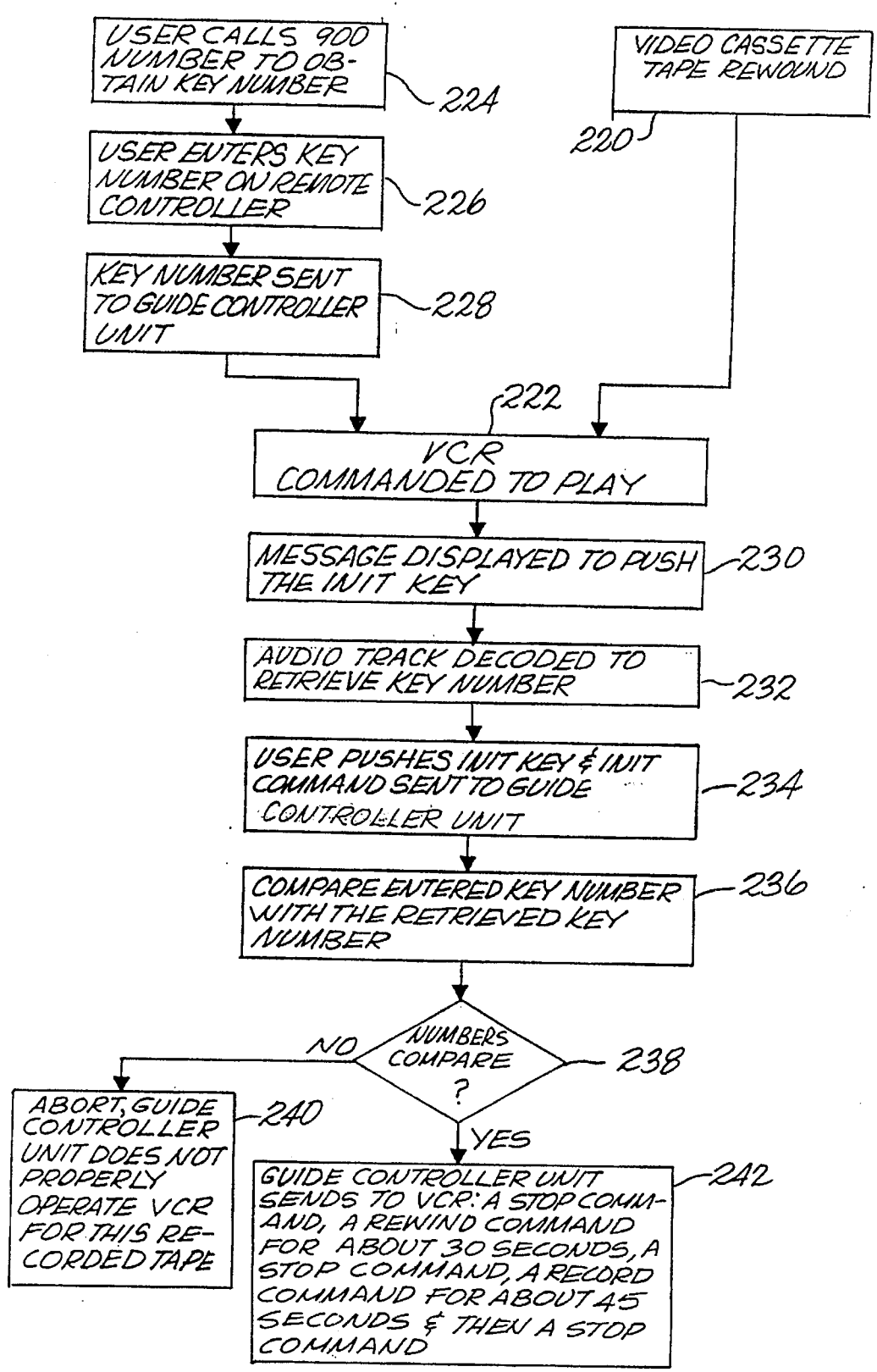
FIG. 8 is a flow graph of steps for initializing a tape after a transmission and recording of a television guide with video clips according to the present invention.

To use the tape that has been recorded by the steps of FIG. 7, the user must first rewind the tape as shown in step 220 of FIG. 8. Then to charge the user for using the television guide with video clips, in step 224 the user calls a 900 number to obtain a key number. In step 226 the user enters the key number on number keys 42 of remote controller 16. In step 228 the entered key number is sent to guide controller unit 10 and stored in memory 28. Then in step 222 the video cassette recorder 12 is commanded to play. The message 184 of FIG. 6 is displayed to the user asking the user to push the INIT key 44 on remote controller 16. The key number from guide data 186 in FIG. 6 is retrieved from the audio track in step 232. In step 234 the user pushes the INIT key 44 and an initialization command is sent from remote controller 16 to guide controller unit 10. In step 236 the entered key number is compared with the retrieved key number. If the key numbers do not compare as determined by step 238, then the operation of guide controller unit 10 will be aborted in step 240 so that the tape will not operate properly in video cassette recorder 12. If the key numbers do compare, then guide controller unit 10 sends to the video cassette recorder 12 a stop command, then a rewind command for about thirty seconds, then a stop command, then a record command for about forty-five seconds and finally a stop command, as shown in step 242. Step 242 effectively erases from the tape the message 184 to initialize the tape and the corresponding audio tones which have the transmission indication and the key number as shown in element 186 of FIG. 6. After step 242 is executed the tape may be played in the manner indicated in FIG. 4. The timing intervals of step 242 are chosen so that the VCR 12 will rewind far enough so that the tape is at a point before the elements 184 and 186 of FIG. 6, and so that the VCR 12 stays in the record mode for a sufficient time to erase the elements 184 and 186 of FIG. 6, stopping at a point where the video is displaying the title of the program. A VISS mark is placed near the end of the title screen 188 of FIG. 6, so that on subsequent play sessions the user can use the index feature of the VCR 12 to fast-forward to the title. With the items 184 and 186 erased then when the tape is subsequently played the guide controller unit 10 will treat the tape as it would a prerecorded tape. For example, the still frame Commands will not be ignored, and any index audio tones in the audio track will be ignored.

Again, the advantage of the methods of FIG. 7 and 8 is that the guide controller unit 10 does not have to be turned off during the transmission of the television guide with video clips.

The television guide with video clips can be used for showing previews of television programs or movies and can also be used for classified advertisements and infomercials, such as for cars and real estate. The television guide with video clips can also be used for video magazines and yellow pages.

In another embodiment of the invention, the entire guide is transmitted as tones encoded in the audio. One reason to transmit the guide in the audio is that the audio will not be stripped by a cable company from the television signal. There are several ways to avoid annoying the listener when the tones are played. First, it is assumed that the guide is transmitted during the night when channel rates are lower and the user's television is OFF-hence the audio tones will not be heard. During subsequent playback if a start message audio tone, which indicates the beginning of the guide, is detected by the audio decoder 22 in guide controller 10, then the guide controller 10 will send a signal to the serial port 50 to cause the VCR 12 to mute the audio signal coming from the audio head. This effectively blocks any audio output from the VCR 12 to the television 14. An end of message audio tone at the end of the guide restores the audio.

Figure 9:
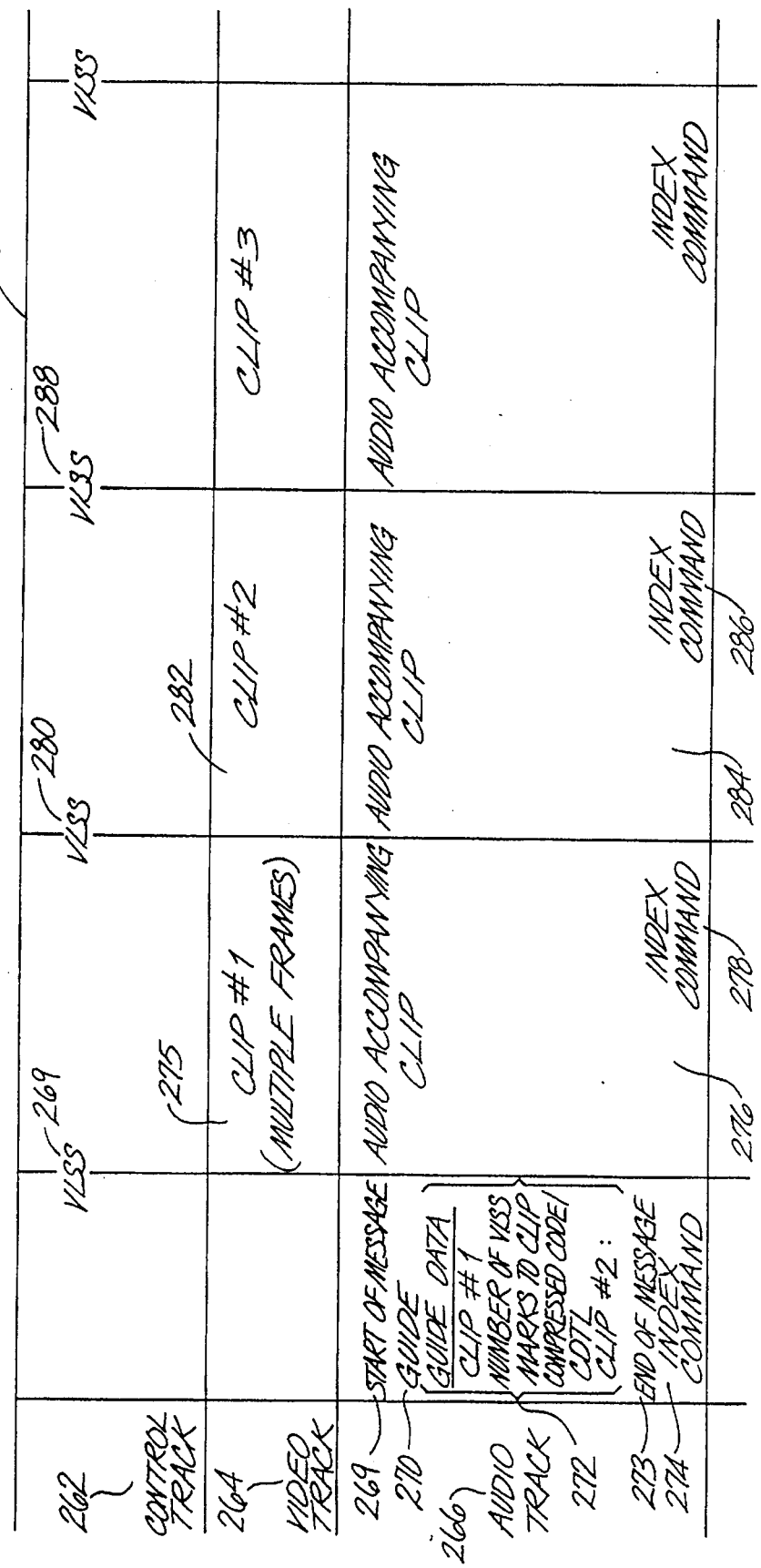
FIG. 9 is a drawing of a tape layout having a guide in the audio track according to the present invention.

FIG. 9 shows a section of tape that has been recorded by VCR 12 during the transmission of a guide in the audio. The tape 60 has a control track 262, a video track 264 and an audio track 266. At the beginning of the transmission a start of message 269 is transmitted in the audio signal and recorded in the audio track 266. Following the start of message 269, the guide 270 is transmitted and also recorded in the audio track 266. The guide 270 can be followed by the transmission of guide data 272 which is recorded in the audio track 266. At the end of the guide or the guide data the end of message 273 is transmitted and recorded in the audio track. In order to place an index mark on the tape, after the end of message 273, an index command 274 is transmitted and recorded in the audio track. When index command 274 is decoded by audio decoder 22 during the transmission, then the VCR 12 is commanded to write an index mark or VISS mark 269 into the control track 262. Following the transmission of the guide and guide data then video clips and audio accompanying the video clips can be transmitted. The guide data 272 can be used by a viewer to view a certain video clip by forwarding the tape from the beginning of the tape by the number of VISS marks to a clip as specified in the guide data. The guide data can also be used to specify the recording of a program corresponding to a video clip or an entry in the guide by entering a channel, day, time-of-day, and length for the program or entering a compressed code representing a channel, day, time-of-day, and length for a program.

At the end of each clip such as clip 275, an index command 278 is transmitted at the end of the audio accompanying the clip and decoded by audio decoder 22 to write VISS mark 280 onto the control track 262. The index command is also recorded into the audio track 266 during the transmission.

Figure 10:
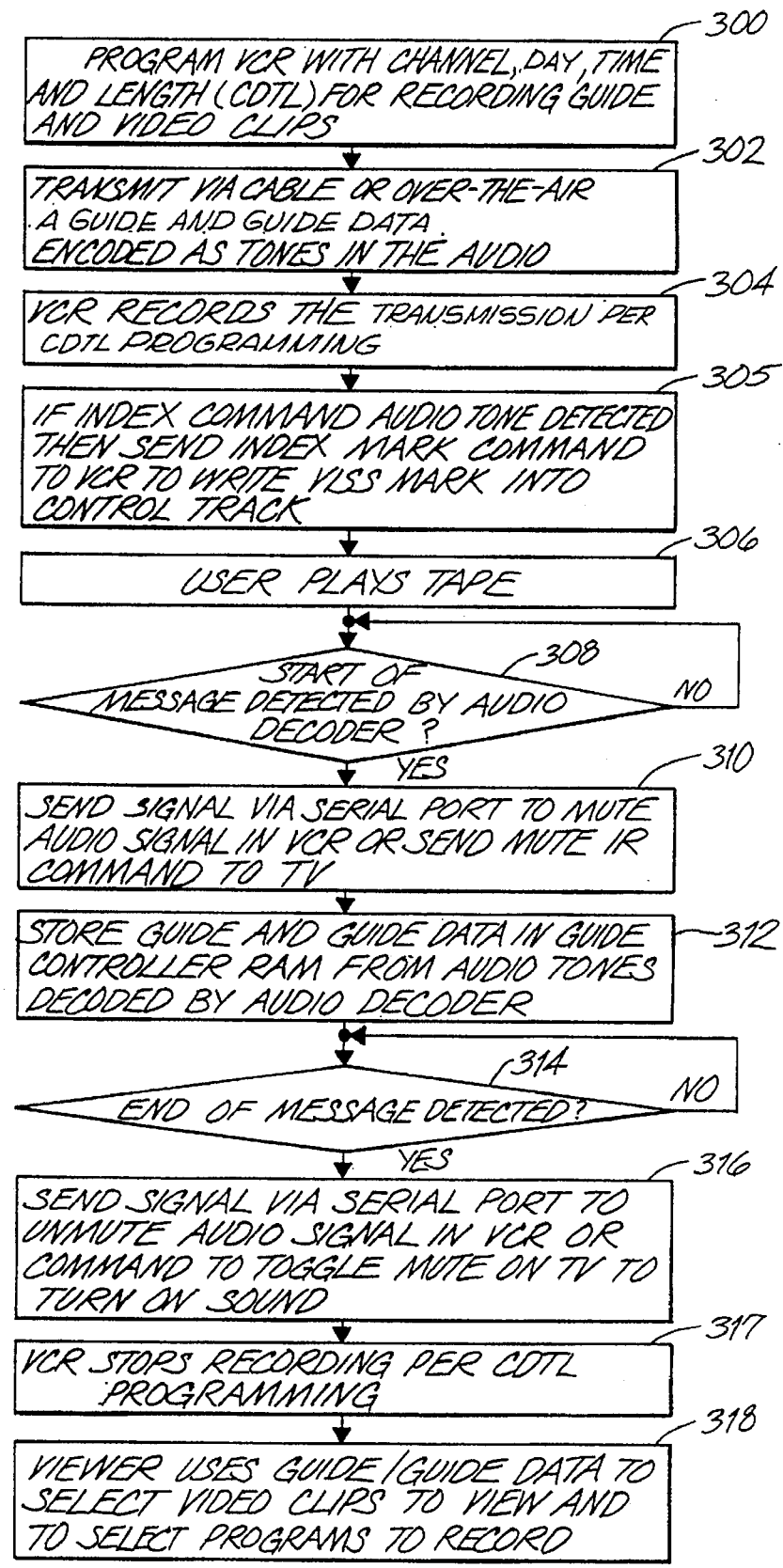
FIG. 10 is a flow graph of steps for using the apparatus for a television guide transmitted in the audio according to the present invention.

FIG. 10 is a flow chart of the method of using the guide controller 10 with the VCR 12 to record the guide and guide data. In step 300 it is shown that the VCR is programmed with channel, day, time-of-day, and length (CDTL) for recording during the time of transmission of the guide and the video clips. As discussed above this can be done by entering a compressed code compressed in length from the channel, day, time-of-day, and length (CDTL). Then in step 302 either via the cable or over the air transmission, the guide and guide data are transmitted encoded as tones in the audio signal. The VCR records the transmission at the time specified by the programming in step 304. During the recording if an index command audio tone is detected, then a index mark command is sent to the VCR tow rite a VISS mark into the control track as shown in step 305. After the transmission is recorded the user plays the tape in step 306. In step 308 it is determined whether a start of message 269 is detected by the audio decoder. If a start of message is detected then in step 310 the guide controller 10 sends a signal via the serial port 50 to VCR 12 to mute the audio signal in the VCR, which removes the audio signal from the television 14. Alternately, a mute command can be sent via infrared emitter 30 and infrared detector 34 to television 14. Then in step 312 the guide and guide data decoded from the transmission by audio decoder 22 is stored into RAM 28. In step 314 it is determined whether an end of message has been detected. If an end of message has been detected, then in step 316 a signal is sent via the serial port 50 to unmute the audio signal in the VCR. Alternately a command can be sent to toggle the mute signal on the television 14 in order to turn the television sound on. The VCR 12 continues to record the transmission until the length of the recording matches the length of the CDTL programming. Then in step 318 the viewer can use the guide and guide data to select video clips to view and to select programs to record in the future.

The guide 270 transmitted and stored in the RAM 28 can be displayed on television 14 as shown as guide display 380 in FIG. 12. The user selects a program in the guide display 380, for example Murphy Brown 386, by operating cursor 59 on remote controller 16 to place a cursor on the program Murphy Brown 386 or by entering the number 3 on remote controller 16, as indicated by guide display element 384. To record a later transmission of the program the user pushes the record button 46 on remote controller 16. If the record button 46 is pushed then a compressed code or a channel, day, time-of-day and length for the selected program are sent to the VCR 12 to program the VCR 12 to record the program when it is transmitted. For example, for Murphy Brown the compressed code, as shown on FIG. 12, is 5941.

As described above, the compressed codes each have at least one digit representative of, and compressed in length from, the combination of the channel, day, time-of-day, and length and can be decoded into channel, day, time-of-day, and length. If the guide is transmitted daily, then the day information is not necessary. Also contained in the guide display element 386 is the channel number, day, time-of-day and length for Murphy Brown, which are channel 2, October 17, 7:00 p.m and 30 minutes.

A video clip may have been transmitted and recorded for certain programs in the guide 380. These can be marked in the guide by an asterisk (*) as shown in element 383 in FIG. 12. The user can select to view the clip for Entertainment Tonite by entering the number 2 and pressing view button 48. Then the guide controller will command the VCR to advance or rewind by the proper number of VISS marks to the beginning of the clip. The guide controller 10 can keep track of the position of the tape by tracking the number of VISS marks from the beginning of the tape. Therefore once the user has watched one video clip the guide controller 10 can assist the user in accessing another video clip.

In the method of FIG. 10, the guide and guide data transmitted in the audio signal are both recorded on the VCR tape during the transmission and then are played; however, the audio tones are muted from the television to avoid annoying the user. The following presents a simpler system, which eliminates the need to mute or record the audio tones. It is presumed that there is enough memory 28 in the guide controller 10 to store the entire guide for the relevant period, which can be one day, seven days or an entire month. In accordance with CDTL or compressed code programming of the VCR, the VCR 12 turns on to start recording just before the time of transmission, which is most likely at night. At the beginning of the transmission, a start of message audio tone is transmitted and detected by the guide controller 10 via the audio decoder 22. The guide controller then sends a stop command to stop recording to the VCR 12 through the serial port 50. The VCR stops recording while all of the audio tone data for the guide is transmitted, and during the guide transmission time the tones are passed through the VCR audio out port 20 to the guide controller 10, where they are decoded by audio decoder 22 and stored into RAM 28. At the end of the guide transmission, an end of message audio tone is transmitted which causes the guide controller 10 to send a record signal to the VCR 12 through the serial port 50. The VCR 12 then starts to record the video clip portion of the guide. During recording the audio decoder 22 determines whether an index command, such as index command 278, has been transmitted in the audio. If so, then an index mark command is sent to the VCR 12 tow rite a VISS mark, such as VISS mark 280 into the control track of the tape, as shown in FIG. 9.

Figure 11:
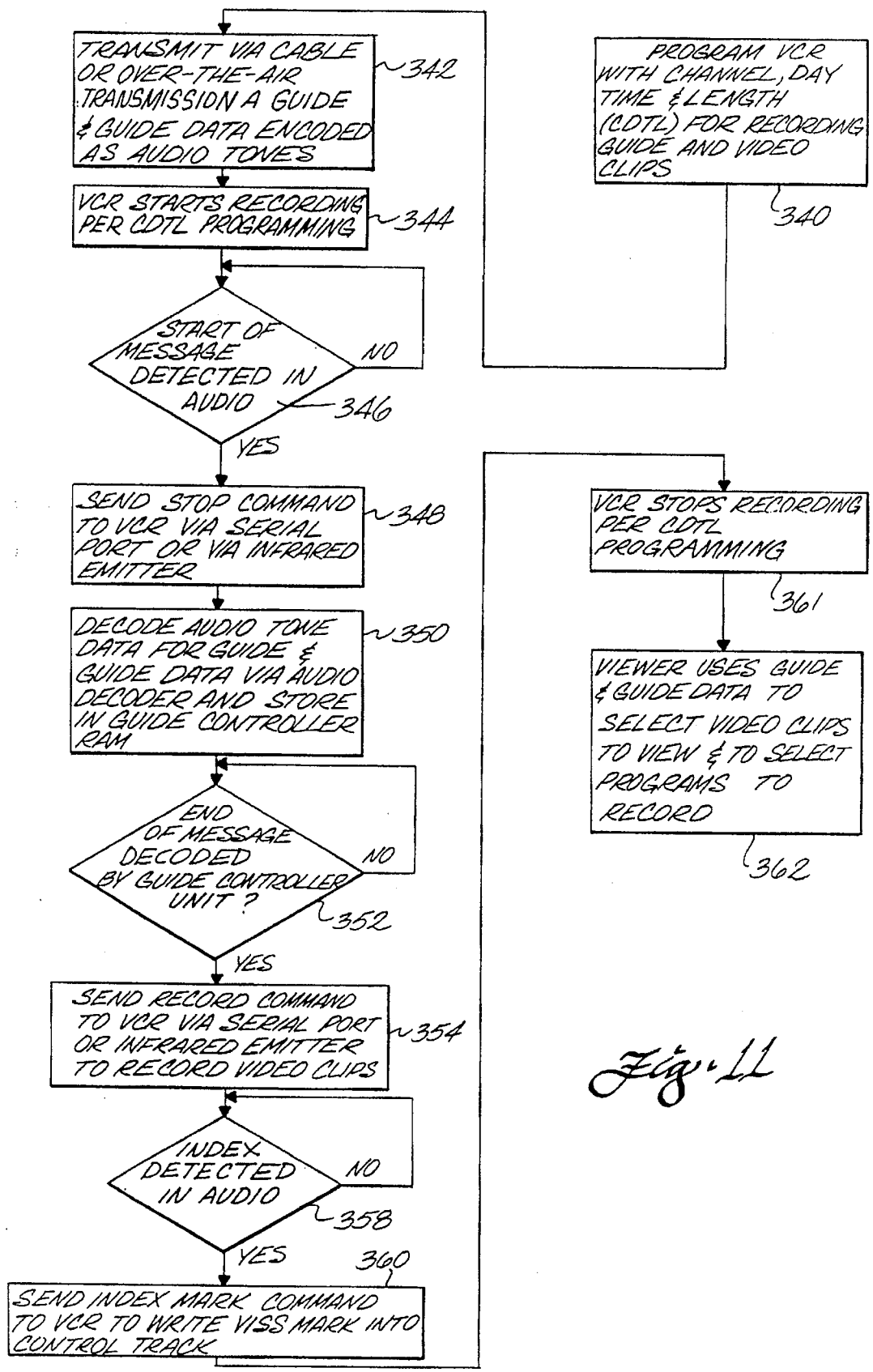
FIG. 11 is a another flow graph of steps for using the apparatus for a television guide transmitted in the audio according to the present invention.

FIG. 11 is a flow graph of steps for using the apparatus for a television guide transmitted in the audio according to the present invention. In step 340 the VCR is programmed with a channel, day, time-of-day, and length or compressed code for recording at the time of the transmission. Then in step 342 the guide and guide data encoded as audio tones are transmitted via cable or over the air transmission. In step 344 the VCR starts recording according to the programming in step 340. In step 346 it is determined whether a start of message audio tone has been detected. If a start of message audio tone is detected then in step 348 a stop command is sent to the VCR via serial port 50 or via infrared emitter 30 and IR detector 32 on the VCR. While the VCR is in a stop mode the VCR does not record. The guide and guide data are then transmitted and sent via audio output 20 to audio decoder 22 and then stored in guide controller RAM 28 as shown in step 350. In step 352 it is determined whether an end of message audio tone has been decoded by guide controller unit 10. If the end of message is decoded then in step 354 a record command is sent to the VCR via serial port 50 or via the infrared emitter 30 on the guide controller and the infrared detector 32 on the VCR. Now any video clips in the transmission are recorded. In step 358 it is determined whether any index audio tones are detected and if they are then in step 360 an index mark command is sent to the VCR to write a VISS mark into the control track. The index mark command can be sent via serial port 50 or via the infrared emitter 30 on the guide controller and the infrared detector 32 on the VCR.

Then in step 361 the VCR stops recording when the length of recording is the same as the length specified by the VCR programming in step 340. Then in step 362 the viewer can use the guide or guide data to select video clips to view or to select programs to record. The guide and guide data can be displayed as shown in guide display 380 in FIG. 12.

In another embodiment of the invention, the guide and guide data are transmitted in the vertical blanking intervals of a television signal rather than the audio signal. Before discussing the details of this embodiment, television signal vertical blanking interval lines are described. The following description describes the manner of embedding data in a video signal at a station and decoding the data at a receiver.

Video images in a cathode ray tube (CRT) type-video device, e.g. television, are generated by scanning a beam along a predefined pattern of lines across a screen. Each time all the lines are scanned, a frame is said to have been produced. In one implementation, such as used in the United States, a frame is scanned 30 times per second. Each television frame comprises 525 lines which are divided into two separate fields, referred to as field 1 ("odd field") and field 2 ("even field"), of 262.5 lines each. Accordingly, these even and odd fields are transmitted alternately at 60 Hz. The lines of the even and odd fields are interleaved to produce the full 525 line frame once every 1/30 of a second in a process known as interlacing. Another standard in the world uses 625 lines of information and interlace 312 and 313 lines at 50 fields per second. In the 525 line standard used in the United States, approximately 480 lines are displayed on the television screen.

Figure 13:
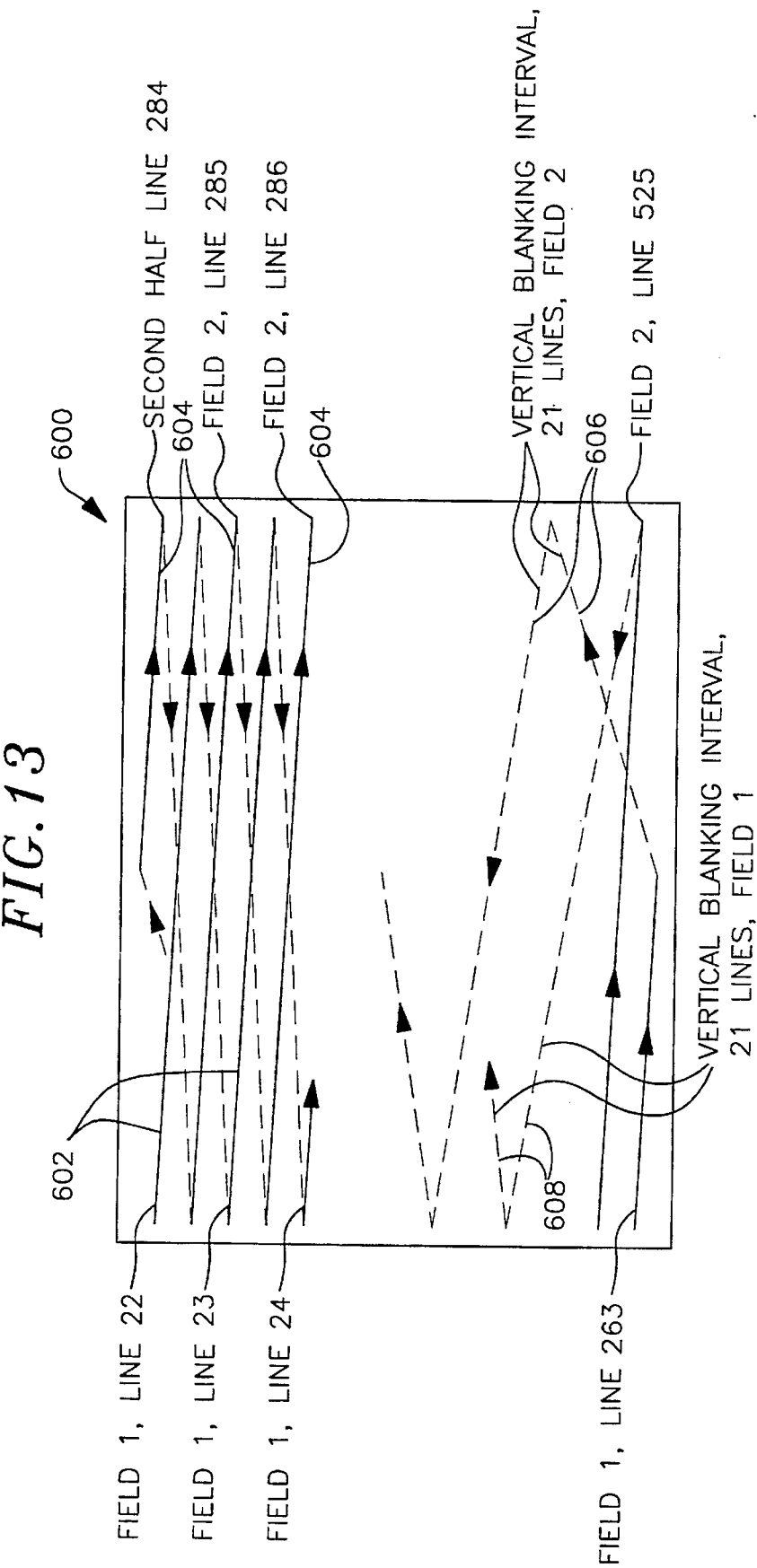
FIG. 13 is a schematic diagram illustrating an interlaced raster scanning pattern of a conventional television.

FIG. 13 is a schematic diagram illustrating the interlaced scanning pattern 600 on a screen of a conventional television receiver. A video display scans the beam from the top left hand corner and scans across the screen (line 22, field 1 in FIG. 13). After it finishes scanning the first line, the beam returns to the left hand side during a period known as a horizontal blanking interval and repeats scanning along another line which is parallel to but lower than the previous line (line 23, field 1 in FIG. 13). The scanning continues along the lines until the beam reaches the center of the bottom part of the screen (line 263, field 1) to complete field 1, which is comprised of lines 602.

From the bottom center of the screen, the beam returns to the top where it starts scanning from substantially the center of the screen along the lines 604 for field 2 which interlace the lines of field 1. This is not an instantaneous bottom to top jump but actually requires the length of time to scan 21 horizontal lines. These lines 606 are lines 1 through 21 of field 2. The second half of line 21 field two (line 284 as shown in FIG. 13) is displayed. Then lines 285 to 525 of field 2 are scanned to complete field 2. When the beam reaches the bottom, right hand corner of the screen, the picture frame is formed. Then the beam retraces to the top and the vertical blanking interval lines 608 are numbered 1 through 21 of field 1. In the NTSC protocol widely used in North America, each field contains 262.5 horizontal lines and a pair of fields constitute a single 525 line video frame and creates one video picture at one instant in time on the video display.

During the time in which the beam returns from the bottom to the top of the screen between the fields, it carries no video or picture signals because it does not produce any picture element on the screen. This time interval is generally known as the vertical blanking interval (VBI). Its duration is typically 21 times the time duration that it takes the beam to scan across the screen. In other words, the duration of the VBI is equal to the time for the beam to scan 21 lines and is divided into 21 lines. In interlaced scanning, the VBI is identified by the field with which it is associated. Apparatus and methods using the NTSC standard with 21 lines in each VBI are well known in the art and therefore are not discussed in detail herein.

Figure 15:
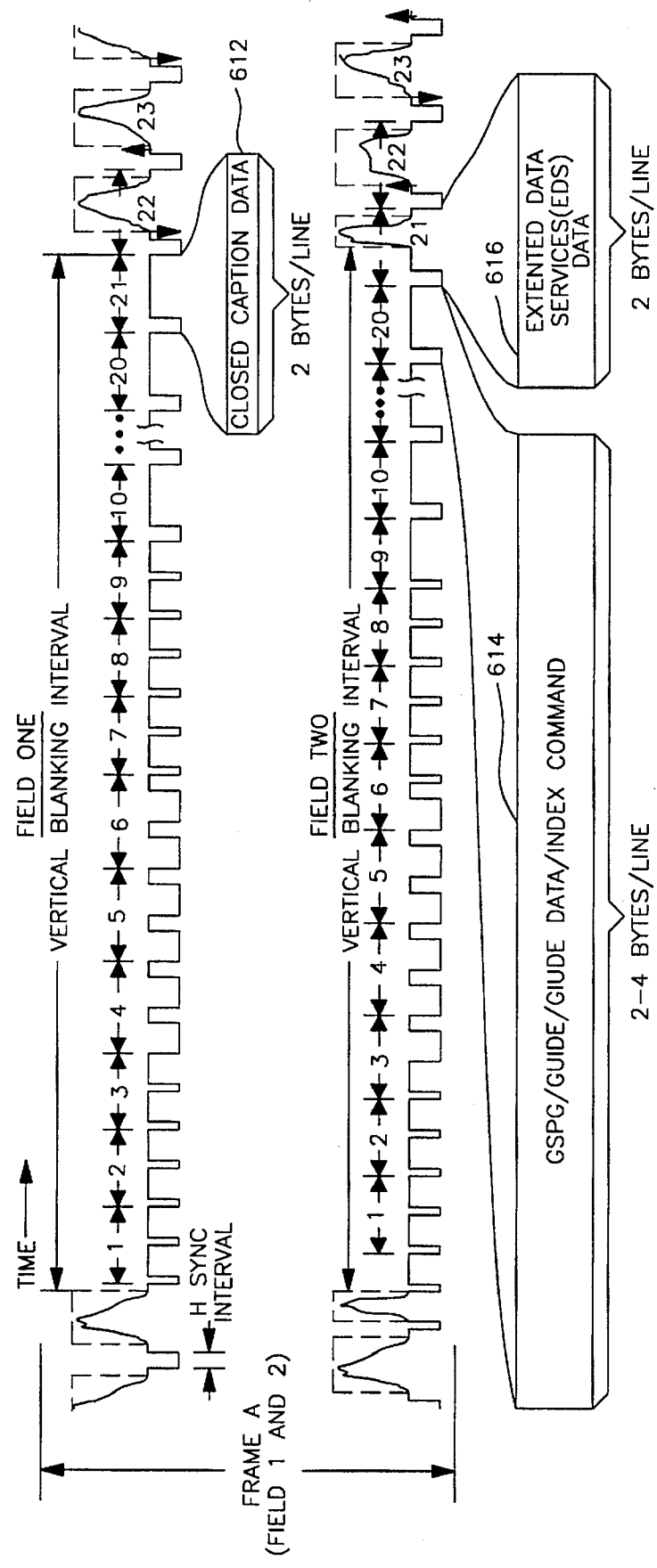
FIG. 15 is a timing diagram showing the vertical blanking interval (VBI) lines of field 1 and field 2 of a interlaced raster scanning pattern of a conventional television and data in the VBI according to the present invention.

Because no image is produced on the display during the vertical blanking interval, no picture information therefore needs to be carried by the broadcast signals. Thus, the VBI is used for conveying auxiliary information from a television network or station to an audience. For example, closed caption data associated with the television program are transmitted as encoded composite data signals in VBI line 21, field 1 of the standard NTSC video signal, as shown in FIG. 15.

Lines 1 through 9 of the VBI of each field are used for vertical synchronization and post equalizing pulses. Thus, lines 10 through 21 are available for auxiliary information.

Figure 14:
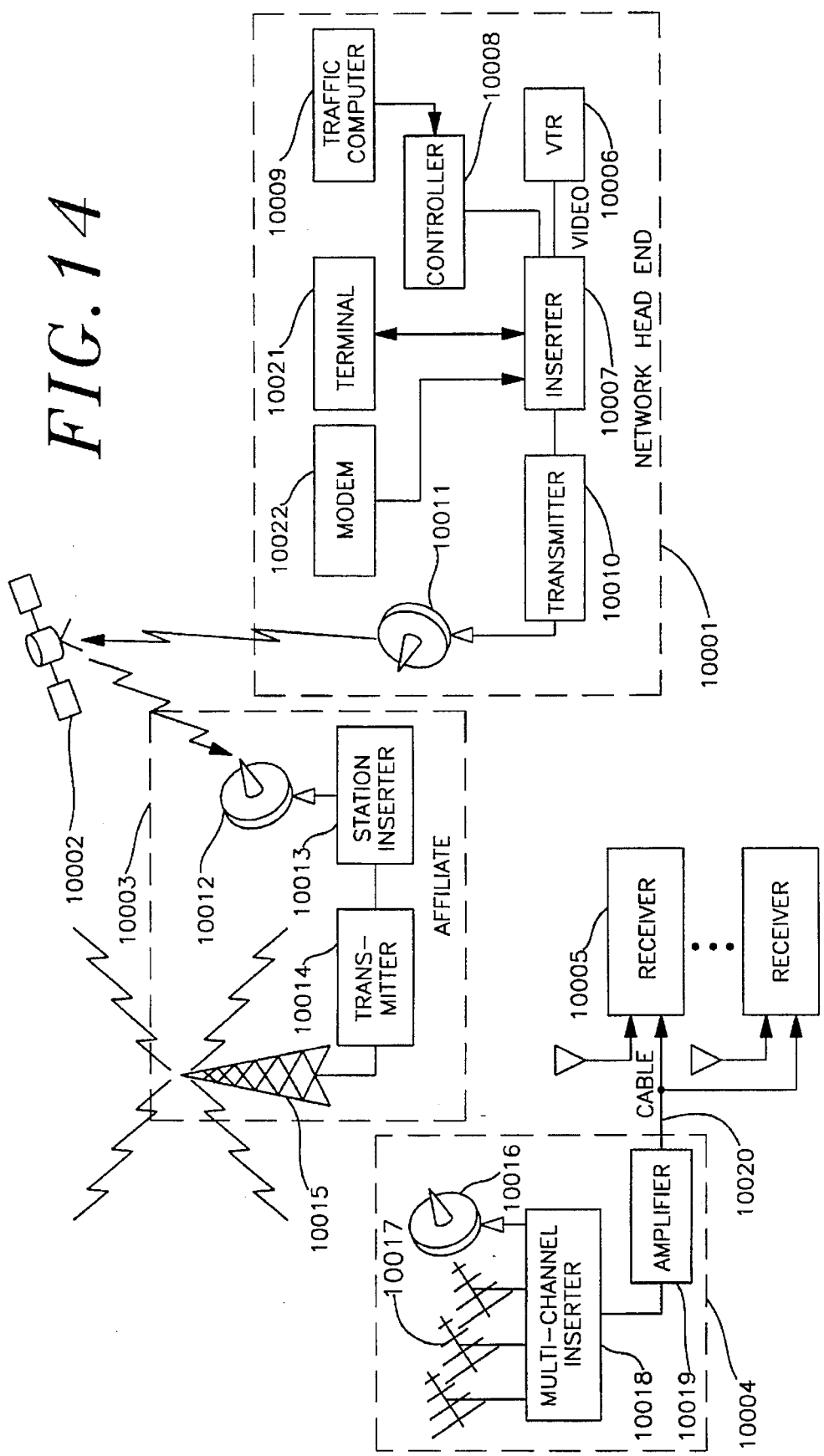
FIG. 14 is a functional block diagram of a television video and data transmission system.

FIG. 14 is a functional block diagram of a data transmission system. As used herein, the terms "broadcast" and "transmit" are used interchangeably for the transmission of signals over cable or fiber optics, to or from satellites, over the air, and the like. A network head end 10001 transmits a composite television signal containing inserted information in a portion thereof, typically the vertical blanking interval, to a satellite 10002 which rebroadcasts the same to a local affiliate 10003. The affiliate 10003 may further insert data into the vertical blanking interval of the received television signal and transmit the same to a local cable head end 10004. The cable head end 10004 receives television signals from a plurality of sources (including satellites) and may further insert data into the vertical blanking interval of any of the television signals. The signals from the plurality of sources are combined into a composite television signal, amplified, and provided over a cable to a plurality of individual receivers 10005, which can include televisions, cable boxes, VCRs and satellite receivers. In addition, the individual receivers 10005 may receive signals directly from the local affiliate 10003 by air, which may include the use of a satellite 10002, or by cable.

More specifically, the network head end has a video tape recorder (VTR) 10006 for providing a program signal to an inserter 10007. A controller 10008 also at the head end controls the scheduling of loading tapes from a cart (a machine with a plurality of video tape cassettes which are moved by a robotic arm from a storage location and inserted into a video tape recorder and vice versa). Furthermore, the controller 10008 controls the lighting of stages during live broadcasts, such as news broadcasts. The controller 10008 is typically a microprocessor based system. A traffic computer 10009 controls the exact timing of playing individual segments of video tapes and inserting commercials therebetween as well as switching between different programs. Some network head ends have both a traffic computer 10009 and a controller 10008. The controller 10008 provides data and commands to the inserter 10007. The traffic computer 10009 provides data and commands to the controller if present. Otherwise, the traffic computer 10009 provides these signals directly to the inserter 10007. The inserter 10007 inserts data into the vertical blanking interval of the composite television signal, as will be described below, and provides the television signal to a transmitter 10010 which in turn provides the television signal on a microwave carrier to a satellite dish 10011 for transmission to the satellite 10002.

The satellite 10002 retransmits the received signal, which is received by a satellite dish 10012 at the affiliate 10003. The dish provides the signal to a station inserter 10013 at the local affiliate 10003. The affiliate may also insert data into the composite television signal as will be described below. The television signal is then provided to a transmitter 10014 and then to a transmitting antenna 10015.

A local cable operator 10004 has a plurality of satellite dishes 10016 and antennas 10017 for receiving signals from a plurality of networks 10001 and affiliates 10003. The received signal from each of the dishes 10016 and antennas 10017 is provided to a respective input of a multi-channel inserter 10018, which can input data into the vertical blanking interval of a received signal. The multi-channel output from the inserter 10018 is amplified in an amplifier 10019 and provided over a cable 10020 to individual receivers 10005. Alternately the receivers 10005 could receive broadcast information via antennas or satellite receivers.

Each receiver 10005 includes a VBI decoder, which can include a VBI slicer and closed caption decoder, that scans VBI lines 10–21 of both fields 1 and 2. In addition it is possible to use the first few visible lines in each video frame for VBI data, for example, lines 22–24. Lines 1 through 9 are typically used for vertical synchronization and equalization and, thus, are not used to transmit data. Closed captioning and text mode data are generally transmitted on VBI line 21, field 1 of the standard NTSC video signal, at a rate of 2 bytes for each VBI line 21, field 1, as shown by closed caption data 612 in FIG. 15. The text mode fields fill the entire screen with text. The default mode is an open ended mode in which the page is first filled up and then scrolled up. The individual recipient of such data has no control over the data. Extended data services (EDS) data can be transmitted on VBI line 21, field 2, as shown by EDS data 616 in FIG. 15, at a rate of 2 bytes per VBI line 21, field 2.

By way of background, the data in the vertical blanking interval can be described in terms of the wave form, its coding and the data packet. The closed caption data wave form has a clock run-in followed by a frame code, followed by the data. The coding of the data is non-return-to-zero (NRZ) 7 bit odd parity.

Under mandatory FCC requirements effective July 1993, color televisions having a size 13" and greater must provide a closed caption decoder. Caption data decoding is further described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS"; Title 47, C.F.R., Part 73.682(a)(22), Caption Transmission format; Title 47, C.F.R. Part 73,699, FIG. 6; "TELEVISION SYNCHRONIZING WAVE FORM"; Title 47, C.F.R., Part 73,699, FIG. 17a; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Under the extended data services (EDS) proposed in the Recommended Practice for Line 21 Data Service, Electronics Industries Association, EIA-608 (drafts Oct. 12, 1992 and Jun. 17, 1993) (hereinafter referred to as "EIA-608" standard"), the subject matter of which is incorporated herein by reference, additional data is provided in line 21, field 2 of the vertical blanking interval. This recommended practice includes two closed captioning fields, two text mode fields and the extended data services. The extended data includes, among other information, program name, program length, length into show, channel number, network affiliation, station call letters, UCT (universal coordinated time) time, time zone, and daylight savings time usage. Upstream at the network, the network inserts the program name, the length of the show, the length into the show, the network affiliation, and the UCT time. Downstream at the affiliate, the affiliate inserts the channel number, the time zone, the daylight savings time usage and program names. The network inserts the data that does not differ for different affiliates.

It is possible for the inserter to insert data other than closed captioning data and EDS data into the television signal. The station inserted data 614 can include data such as a channel specific program guide (CSPG), a guide, guide data, and index commands, which can be inserted into either or both fields in any VBI line between 10 and 21. Use of channel specific program guides (CSPG) are further explained in patent application Ser. No. 08/176,852, filed Dec. 30, 1993 which is incorporated herein by reference as though set forth in full. Television guides, guide data, and index commands that are sent via the vertical blanking interval are further explained in patent application Ser. No. 08/176,216, filed Dec. 27, 1993. For example, the data can be inserted into line 20 of field 2, as shown by data 614 in FIG. 15. The data may be inserted into the VBI at the closed caption rate (1X format) or at two times the closed caption rate (2X format), which is further explained below.

The data may be manually entered from a local terminal 10021, which can be used to pre-build, recall, or edit messages. The terminal 10021 typically includes a computer. In addition, a modem 10022 may be used to provide data to the inserter 10007. The output of the inserter 10007 is a composite television signal with the data inserted.

The timing of video signals in NTSC format is well known in the art. As described above, the vertical blanking interval is the time between the flyback from the bottom of the screen to the top of the screen. Although no video signal is displayed, the horizontal synchronization pulses are still provided during the VBI. The standard data transmission rate is defined in the EIA-608 standard.

Figure 16:
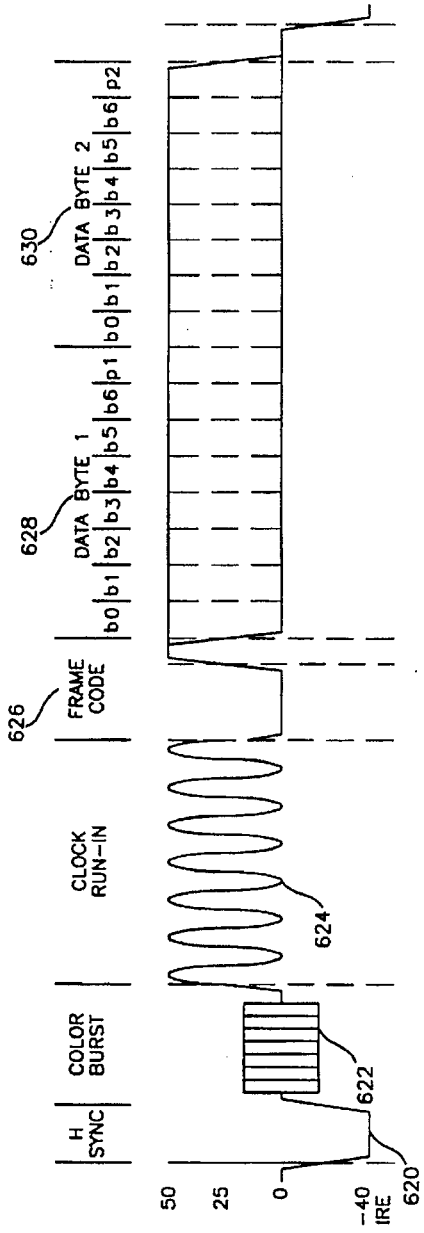
FIG. 16 is a timing diagram of the standard data format (1X) for transmitting data in the VBI.

As shown in FIG. 16, the horizontal synchronization pulse 620 is followed by color burst signals 622. For closed caption and EDS data, a clock run-in cycle 624 follows the color burst which in turn is followed by a frame code 626. The clock run-in is "10101010101." The frame code is "01000011." Two data bytes 628 and 630 are transmitted in each VBI line. Each byte is 8 bits including a parity bit. This format is referred to as the standard data rate format (or 1X format). Each byte in the VBI line is arranged with the least significant byte first. The last bit is used as parity for error checking. Each byte of the transmitted data is parity checked upon receipt. The 1X format is the format used to transmit closed captions in VBI line 21 field 1, as shown by closed caption data 612 in FIG. 15. It is also the format used to transmit EDS data in VBI line 21 field 2, as shown by EDS data 616 in FIG. 15.

Figure 17:
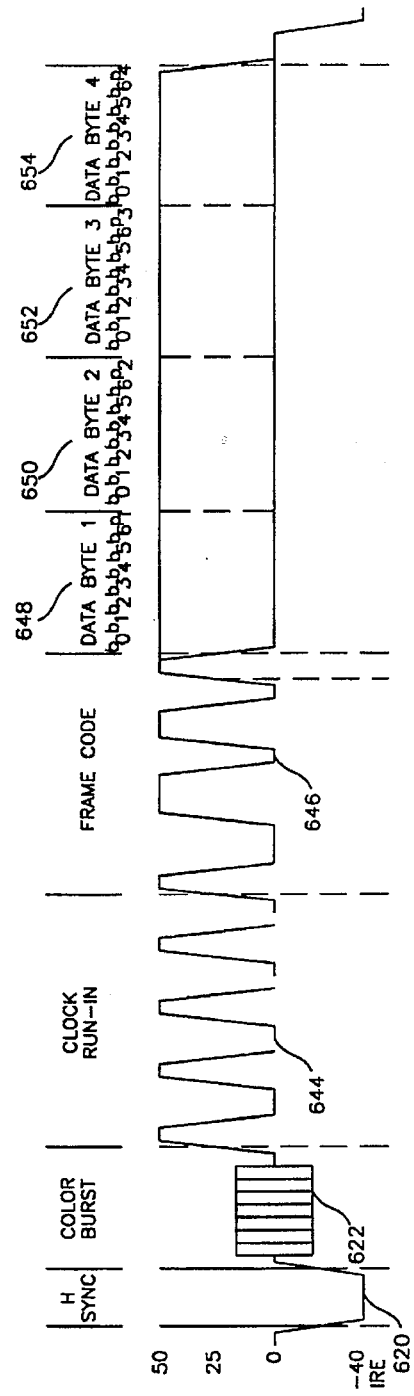
FIG. 17 is a timing diagram of the accelerated data format (2X) for transmitting data in the VBI.

An accelerated data format (2X format) as shown in FIG. 17 uses a bit rate twice that of the 1X format to thereby provide 4 bytes per VBI line. The clock run-in 644 is the bit sequence "10101010." The frame code 646 is "10011101101." Four data bytes 648, 650, 652 and 654 are transmitted each VBI line. The 2X format can be used to transmit data 614 in FIG. 15.

Figure 18:
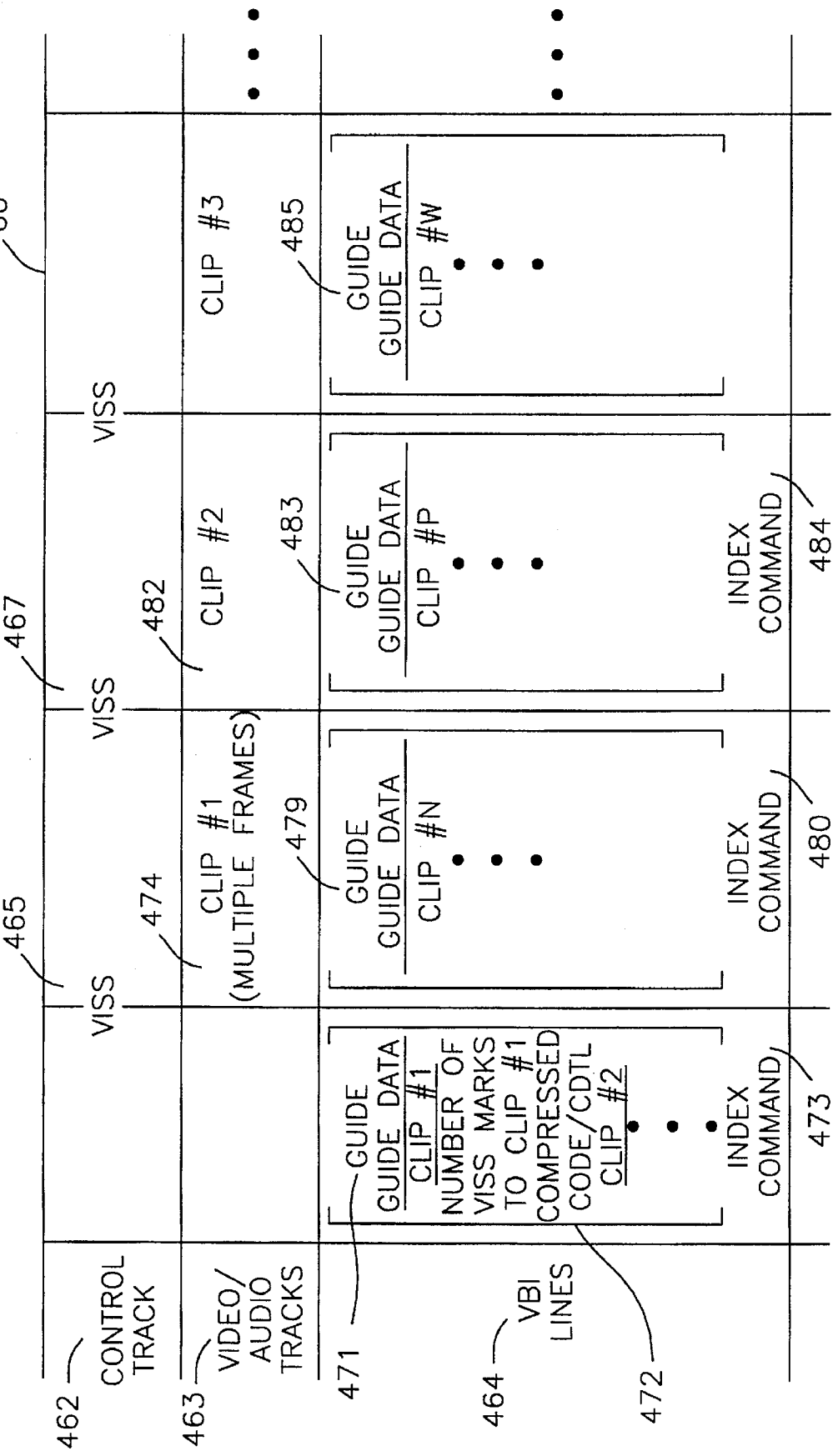
FIG. 18 is a drawing of a tape layout having a guide in the vertical blanking lines according to the present invention.
Figure 19:
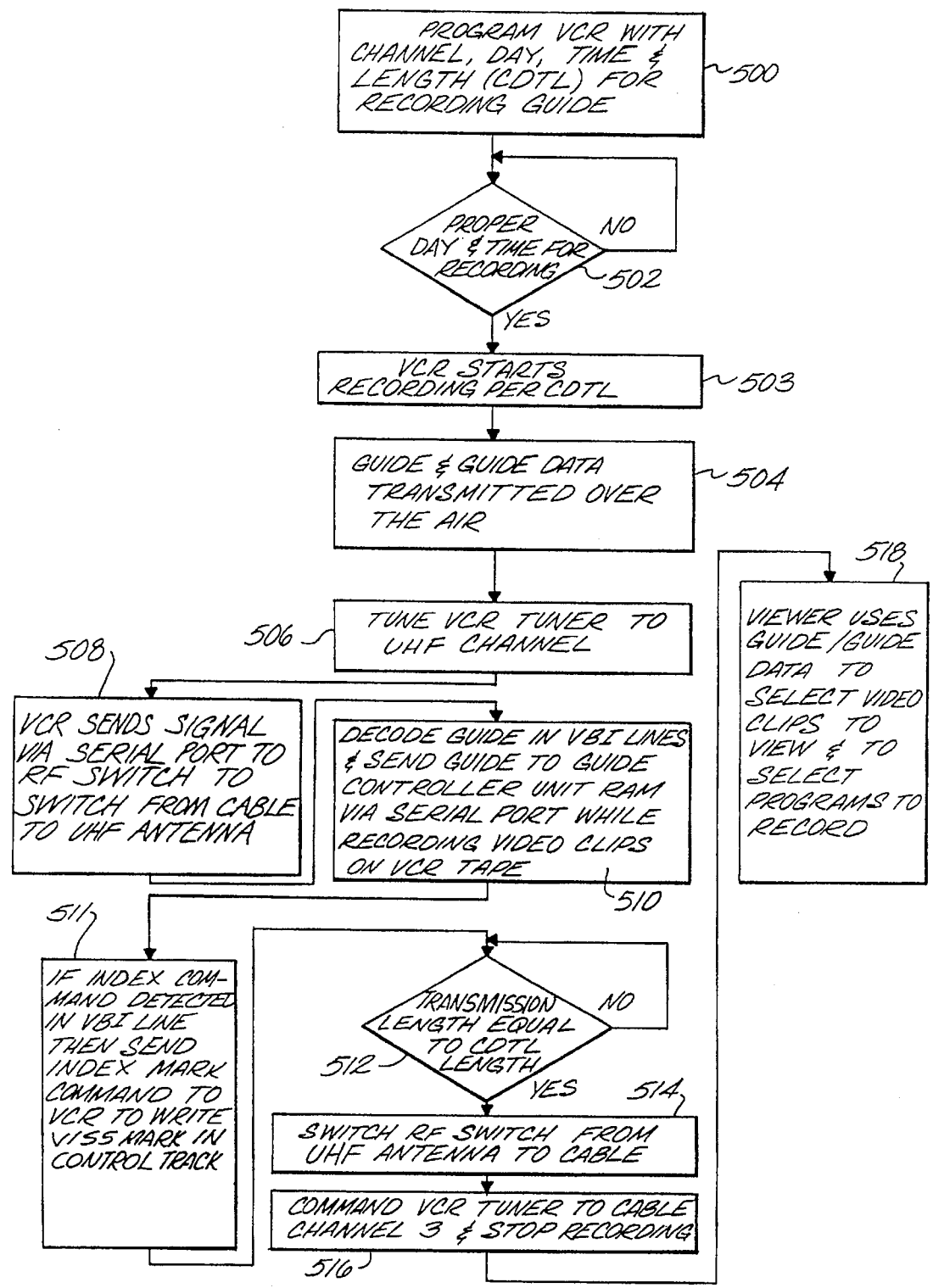
FIG. 19 is a flow graph of steps for using the apparatus for a television guide transmitted in the vertical blanking intervals lines according to the present invention.

In the embodiment illustrated by FIGS. 1A, 18 and 19, the guide and guide data are transmitted in the vertical blanking interval lines of an over the air transmission. The guide controller 10, shown in FIG. 1A, includes an RF switch 54 and a built in UHF loop or bow tie antenna 55. The cable input line 57 is routed from cable box 56 to the guide controller 10 and to the RF switch 54. The RF switch 54 is controlled via microprocessor 24 and guide controller 10 or via serial port 50 in VCR 12. The RF switch can select between the UHF antenna 55 or the cable input line 57 and send the selected signal via line 58 to the tuner 49 connected to the RF input of VCR 12. In this embodiment the signal source 11 of FIG. 1A is disconnected.

To receive the guide the user programs the VCR to record the guide at a designated time and channel on a periodic basis. When programming the VCR, the user enters a designation or indication that this particular program is a television guide. The guide is transmitted on a particular UHF channel generally at night for a duration of 0.5 to 2 hours.

At the appropriate time according to the programming, the VCR is placed in a record mode and a signal is sent via the serial port 50 to the guide controller unit 10 to indicate that a television guide is now being transmitted and received. The VCR tuner 49 is also tuned to the designated UHF channel. The signal sent via the serial port to the guide controller unit 10 is used to switch RF switch 54 to the UHF antenna 55. Thus, the over-the-air transmission is received via the UHF antenna 55. The guide portion of the transmission is transmitted in the vertical blanking interval lines which are decoded by the VBI decoder 74 in the VCR 12, and sent out the serial port 50 to be stored in the guide controller RAM 28, any video clips can be simultaneously transmitted in the video and audio portions of the transmission signal and recorded by the VCR. After the completion of the transmission the VCR 12 causes the guide controller 10 to switch the signal on line 58 to the cable line 57 and the VCR tuner channel is returned to the cable base band channel, for example, channel 3. After recording, the tape appears as shown in FIG. 18.

The vertical blanking interval lines 464 contain guide 471, guide data 472 and an index command 473. The index command 473 is placed just before the start of the first video clip. When index command 473 is decoded by VBI decoder 74 during the transmission, then the VCR 12 is commanded to write an index mark or VISS mark 465 into the control track 462. The guide and guide data are spread throughout the transmission and can be embedded in the video clips, as shown by guide and guide data 479 which are transmitted at the same time that video clip 1 designated as 474 is transmitted. At the end of each video clip such as video clip 474 and just before the next video clip, there is an index command such as index command 480 in FIG. 18. When index command 480 is decoded by VBI decoder 74 during the transmission, then the VCR 12 is commanded to write an index mark or VISS mark 467 into the control track 462.

FIG. 19 is a flow chart of the steps of the method for this embodiment. In step 500 the VCR is programmed with a channel, day, time-of-day, and length or a compressed code for recording the television guide. In step 502 it is determined whether the proper time has arrived for recording the guide. If the proper time has arrived then in step 503 the VCR starts to record the guide which is transmitted over the air on the designated channel in step 504. In step 506 the VCR tuner 49 is tuned to the UHF channel upon which the guide will be transmitted. In step 508 the VCR sends a signal via serial port 50 to RF switch 54 to switch from cable line 57 from cable box 56 to UHF antenna 55. In step 510 VBI decoder 74 in VCR 12 decodes the guide in the VBI lines and sends the guide to guide controller unit RAM 28 via serial port 50. While the guide is being decoded and stored any video clips being transmitted can be recorded on the VCR. During recording on the VCR if any index commands are detected in the VBI lines by the VBI decoder 74 and sent to microprocessor 24 in guide controller 10, then an index mark command is sent from guide controller unit 10 to VCR 12 via serial port 50 or via infrared emitter 30 and infrared detector 32 to command the VCR to write a VISS mark in the control track 462, as shown in FIG. 18. In step 512 it is determined whether the length of the transmission and the recording is equal to the length set in the programming of the VCR in step 500. If the length of the recording of the transmission is equal to the CDTL length then in step 514 the RF switch 54 is switched from UHF channel 55 to cable line 57, and in step 516 the VCR tuner is commanded to the cable base band channel, for example, channel 3 and the VCR is commanded to stop recording. Then in step 518 the viewer can use the guide and guide data to select video clips to view and to select programs to record.

Figure 20:
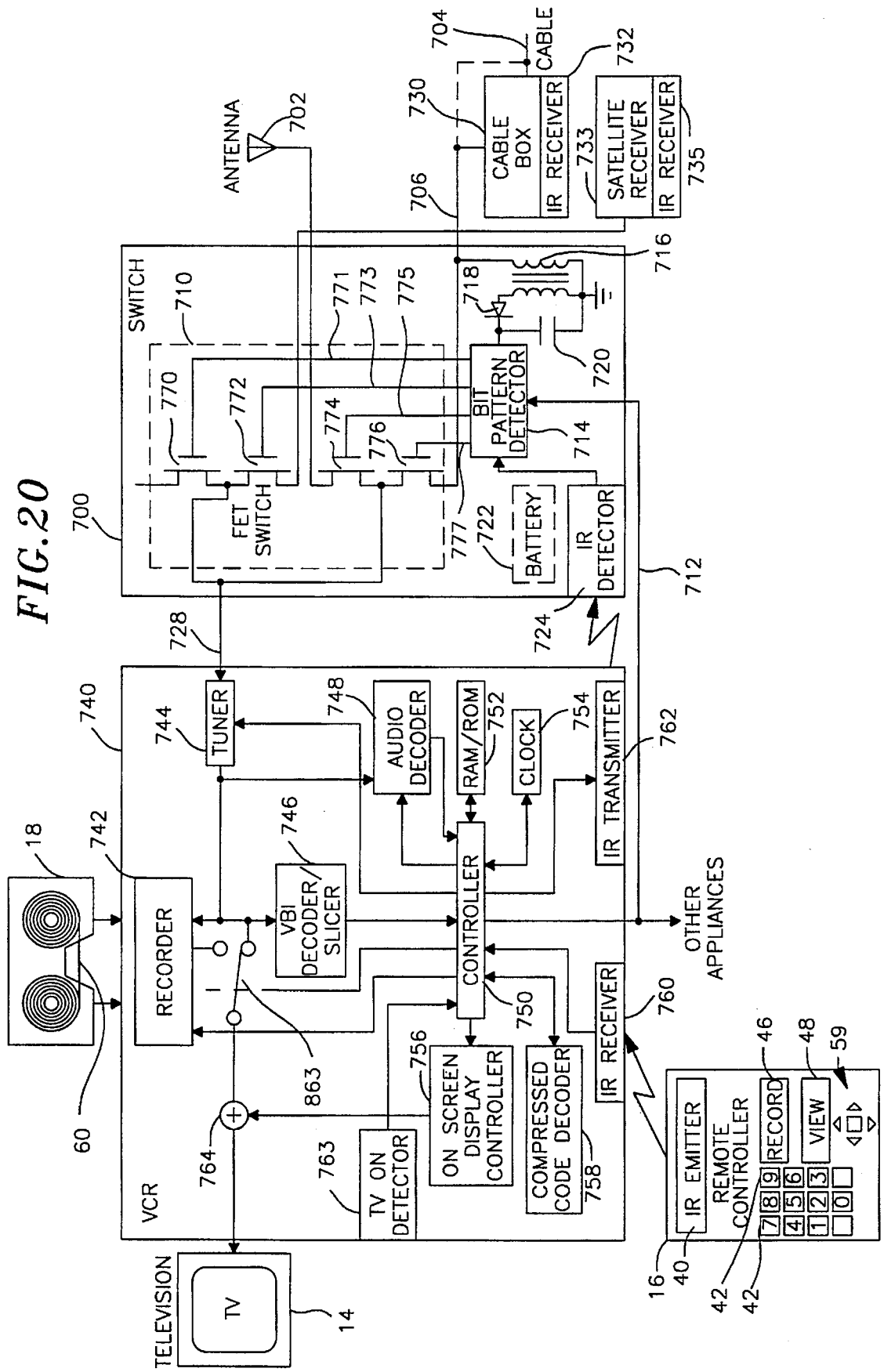
FIG. 20 is a block diagram of a system including a recorder having apparatus for extracting a television guide from a television signal and for controlling a switch for selecting among television signal sources according to the present invention.

In another embodiment of the invention as shown in FIG. 20, a switch 700 has inputs from an antenna 702, a cable box 730, and a satellite receiver 733. The output of switch 700 is sent to a VCR 740. The VCR can record television signals onto tape 60 which is housed inside of video cassette 18. The VCR provides an output to television 14. A remote controller 16 provides controls to VCR 740 via IR emitter 40 and IR receiver 760.

The VCR has a controller 750 that interfaces to the recorder 742, a tuner 744, a VBI decoder/slicer 746, an audio decoder 748, a memory 752 which can be a random access memory and a ROM, a clock 754, an on-screen display controller 756, a TV on detector 763, a compressed code decoder 758, the IR receiver 760, and an IR transmitter 762.

The switch 700 is controlled by the VCR 740 and the output 728 of the switch can be sourced from the antenna 702, the cable box 730 or the satellite receiver 733. A FET switch 710 is used to switch between the various inputs. In one embodiment the controller 750 sends a bit pattern via line 712 to the bit pattern detector 714 in switch 700. Different received bit patterns can control the FET switch 710 to select the desired television signal source. The FET switch 710 includes FET transistors 770, 772,774 and 776 which are gated by signal lines 771, 773, 775, and 777, respectively. In an alternate embodiment the VCR 740 sends controls to switch 700 via infrared transmitter 762 and infrared detector 724 rather than send the bit pattern via signal line 712. As shown in FIG. 20 the switch 700 is a separate unit from VCR 740. Alternatively, the switch 700 can be integral to the VCR 740 and in this case the controller 750 can directly control switch 700. If the switch 700 is separate, then the switch can be powered by a battery 722 or can be powered by extracting power from the cable 706. The power is extracted by transformer 716 and then rectified by diode 718, which is coupled to capacitor 720.

At any one time the FET switch 710 is controlled so that only one television signal source is enabled to be coupled to the output 728. For example, if FET transistor 772 is turned on then the satellite receiver 733 is coupled to the output 728 and if FET transistor 776 is turned on, then cable input 706 is coupled to the output 728. The cable 706 that is attached to switch 700 is either sourced from the output of cable box 730 or from the cable 704 itself. As shown the cable box has an infrared receiver 732. The satellite receiver also has an infrared receiver 735. The infrared transmitter 762 can control the cable box and the satellite receiver 732 via their infrared receivers.

Figure 21A:
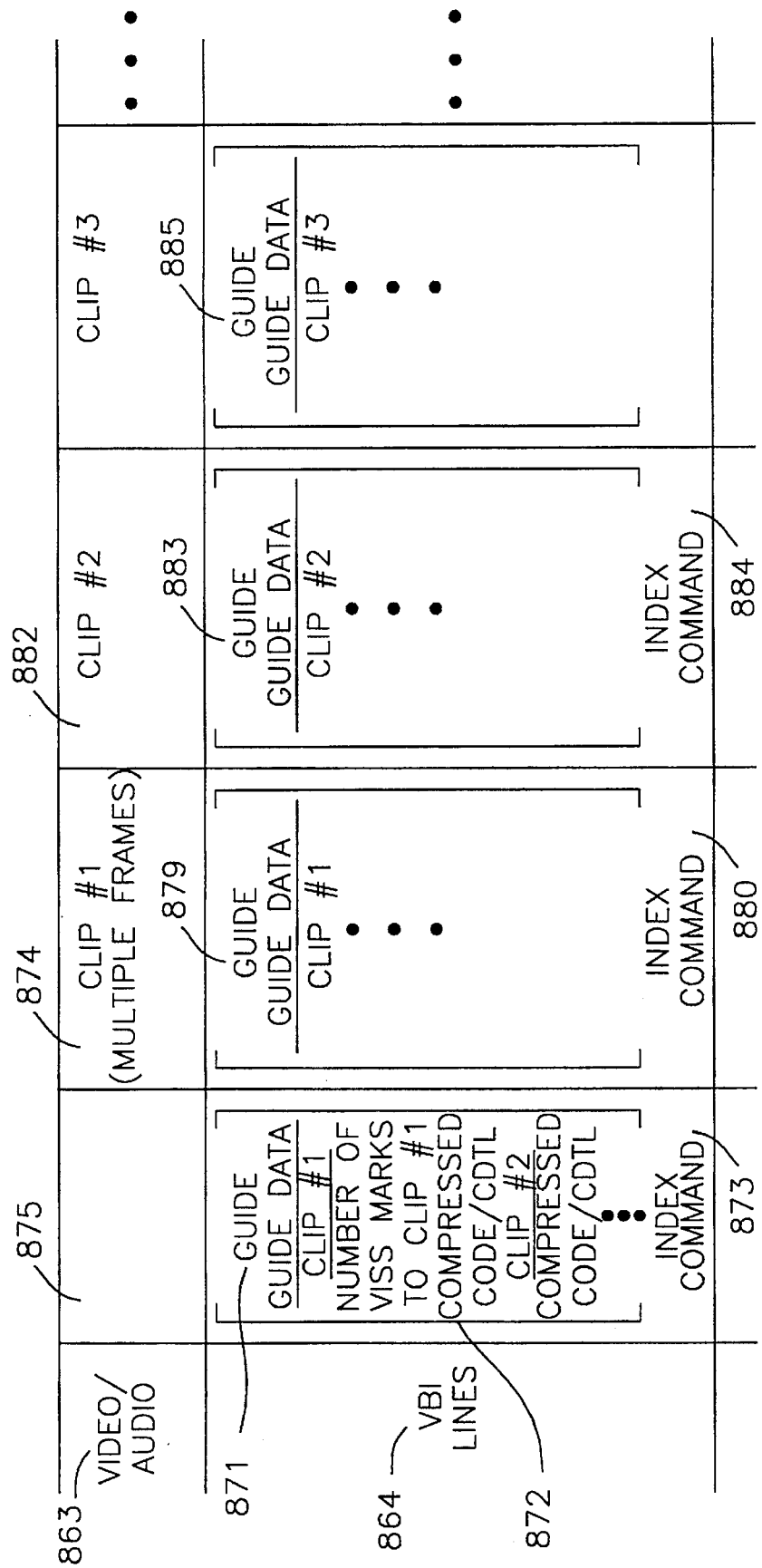
FIG. 21A is a timing diagram showing video clips and audio transmitted along with guide data in the vertical blanking interval lines according to the present invention.

FIG. 21A illustrates one of many possible formats for sending television guide data embedded in a television signal. The television signal into which the guide data is embedded can be from any of the television signal sources and on any of the channels of any of the television signal sources. As shown in FIG. 21A, the video/audio 863 can contain video clips such as clip 874 and clip 882. The VBI lines 864 which are embedded in the video signal as illustrated in FIGS. 13 and 15, can contain television guide data. The television guide data can be transmitted in the VBI lines as shown by guide 871 and overlapped with a blank video/audio portion as shown by element 875. Alternatively, the guide data can be embedded in video clips as shown by the overlap of timing between guide 879 and clip 874 and guide 883 and clip 882. The guide can contain a complete listing of television programs on all available channels for a period of time in the future, for example for the next week. The guide data can also include information for accessing the clips that are transmitted along with the guide. For example, the number of VISS marks to each clip can be listed as shown by element 872 as well as compressed codes or CDTL information, which can be used to program a recorder for recording a program associated with the clip. For example, the clip can be a preview of a program to be transmitted at a later date and the compressed code or CDTL information allows the user to program a recorder to automatically record the program at a later time. As shown, index commands can also be embedded in the VBI lines as indicated by index commands 873, 880, and 884. When the television signal containing the clips and the guide and guide data are received, the television signal can be recorded by a VCR and while this recording occurs the index commands can be used to write VISS marks into a control track on the tape so that a tape is produced with the format shown in FIG. 18. The VISS marks recorded in the control track can be used along with the guide data to enable the user to conveniently access the clips recorded by the VCR for viewing, as discussed above in relation to FIG. 18.

Figure 21B:
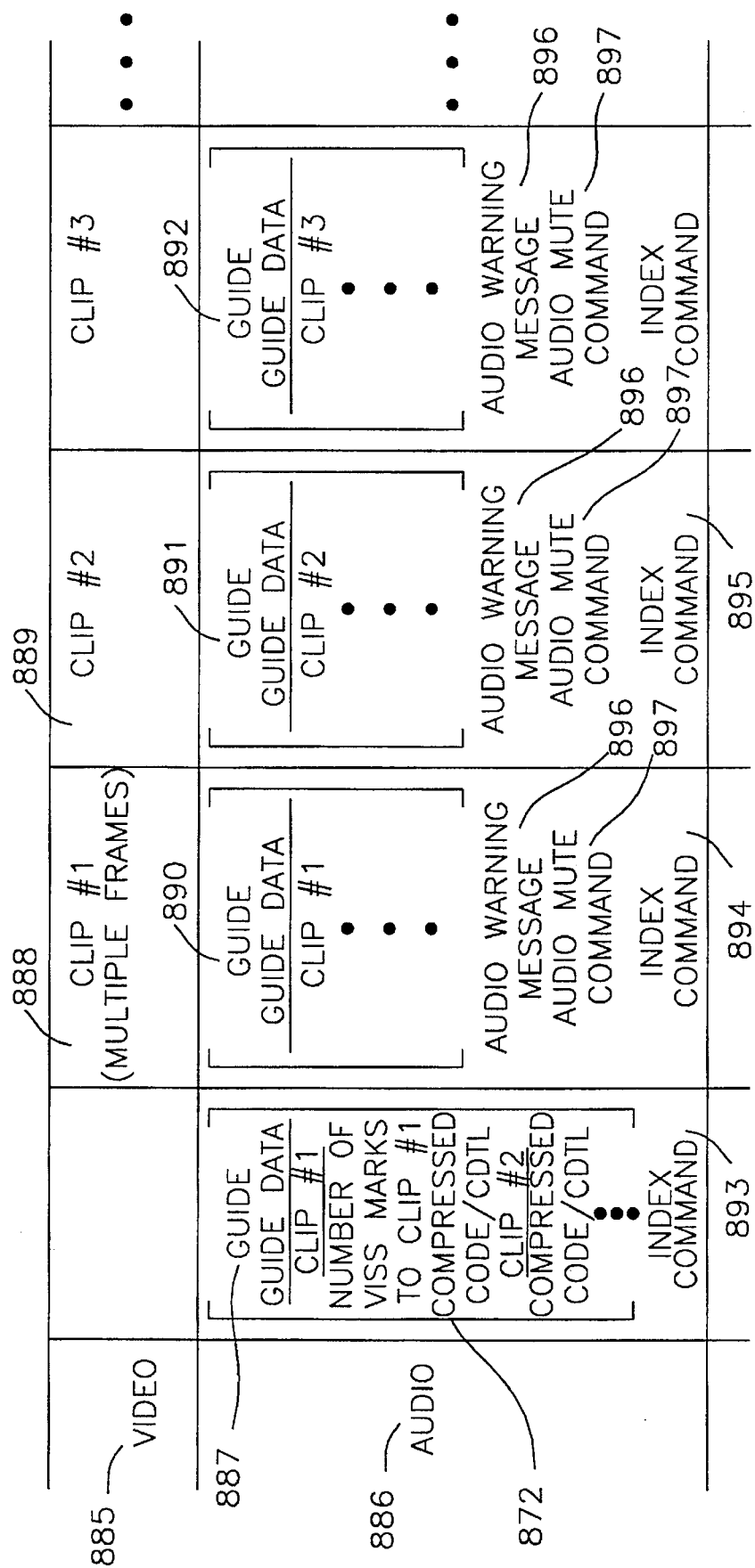
FIG. 21B is a timing diagram showing video clips transmitted along with guide data in the audio according to the present invention.
Figure 25:
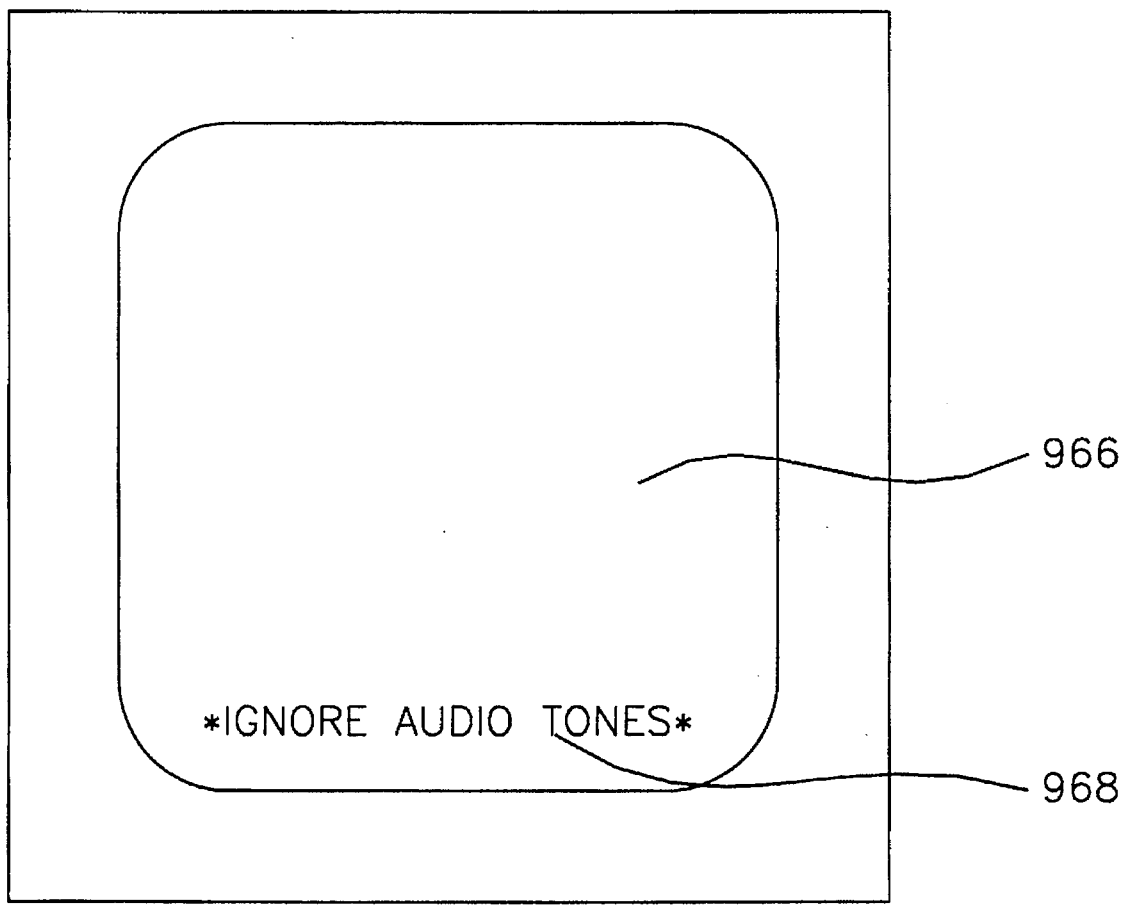
FIG. 25 is an illustration of a television monitor displaying a message to a user to ignore the audio tones when guide data is contained in the audio, according to the present invention.

FIG. 21B illustrates another format for receiving guide and guide data in a television signal from any of the television signal sources and from any channel of the television signal sources. As shown, the guide and guide data is contained in the audio 886 of the television signal. In this case the vertical blanking interval lines are not used for transmitting guide or guide data. The video portion 885 of the television signal can be used to transmit video clips such as clips 888 and 889. The guide and guide data are transmitted as audio tones in the audio as illustrated by guides 887, 890, 891, and 892. The index commands 893, 894 and 895 are used in the same manner as the index commands shown in FIG. 21A, for writing VISS marks onto the control track of a tape if the video clips are recorded by VCR to allow later access of the video clips. Because the video clips have no audio and because the guide is transmitted in the audio during the time that the clips are received in the video signal, an audio warning message 896 is encoded in the audio and is decoded and displayed during viewing of a recorded video clip so that the user can ignore the audio tones caused by the encoded guide and guide data. Alternatively, the audio warning message can be embedded in the video of each of the video clip frames so that the viewer sees a message such as that shown in FIG. 25 which shows a message "ignore audio tones" 968 at the bottom of the television screen 966. In another embodiment an audio mute command 897 can be embedded in the audio tones and can be decoded to command the television to mute the audio during the viewing of the video clips. When the television signal as shown in FIG. 21B is recorded by the VCR, the video clips can be accessed in a manner similar to that of the format shown in FIG. 21A, except that the data in the audio tones are decoded instead of decoding data in the vertical blanking interval.

One scenario for sending television guide data along with video clips is to transmit the television guide and guide data late during the middle of the night when the television is likely to be turned off. The VCR 740 can be preprogrammed to search for the transmitted television guide during particular time periods in the night. For example, the television guide might be transmitted from 2:00 A.M. to 2:30 A.M. and then transmitted again between the times of 4:00 A.M. and 4:30 A.M. The transmission of the guide data can be repeated during the night and even during the day. The VCR would compare the time on clock 754 to the preprogrammed times to determine a time at which to begin a search for the television guide and guide data. However, if the television is ON then it is desirable that the VCR 740 delay the search until the next time that the television guide is transmitted. During the next time the VCR 740 will again determine whether the TV 14 is ON. The TV is considered ON, if video is being displayed on the television monitor. This is detected by TV ON detector 763, which can detect that the TV is ON through the magnetic fields generated by the control of the beam writing the video onto the monitor or by other techniques, such as signals sent from the television 14 to the VCR 740 indicating that the television 14 is ON. Since the guide is transmitted often and is updated as required, the recorder 740 will eventually detect a period of time in which the television guide is transmitted and in which the television 14 is OFF.

Once the conditions of the television being OFF and the proper time for receiving a television guide are satisfied, then the next step is for the VCR 740 to detect a television signal source and a channel in which the television guide is being transmitted. The VCR 740 can be programmed so that a particular television signal source and channel for receiving the guide are specified. In this case the VCR 740 sends commands to switch 710 to select the proper television signal source, and commands to tune to the proper channel to cable box 730, satellite receiver 733, or tuner 744 for over the air broadcasts.

In another embodiment the VCR 740 searches for a television signal source and a channel having the television guide. Once the search has been performed and a television signal source and a channel have been found with the television guide and guide data, then the television signal source and the channel can be stored in RAM 752. The search for guide data can be performed continuously, or only if the TV 14 is OFF, or only during stored time periods. In the latter embodiment, the stored time periods are compared in controller 750 with time read from clock 754. When the times compare and the signal from TV ON detector 763 indicates that the television 14 is OFF, then controller 750 can begin a search for a television signal source and a channel having television guide and television guide data.

Suppose that the switch 700 is switched so that the television signal source is cable 704 or the output of cable box 730. In this case the FET transistor 776 is ON and the other FET transistors 770, 772, and 774 are off. The television signal from the cable or cable box is sent through tuner 744 and can be recorded by recorder 742 while any television guide data is decoded by VBI decoder/slicer 746 or audio decoder 748 depending on the format for transmitting the television guide data as indicated above in the discussion of FIGS. 21A and 21B. The controller 750 determines whether television guide data is contained in the received television signal. If no television guide data is contained in the television signal, then the controller 750 commands the cable box 730 to tune to another channel and the controller again determines whether television guide data is contained in the new channel. If the cable 704 is connected directly to switch 700, then the tuner 744 can be used to tune to the different channels received via cable. Once a channel received via cable is found that contains television guide data then the television guide data can be decoded and stored in RAM 752. The television guide data can then be recalled later from RAM 752 and displayed on television 14 via the on-screen display controller 756. Any video clips recorded while the television guide data was received can also be displayed on television 14. Switch 863 is controlled by controller 750 and switches between the tuner 744 output and the recorder 742 output for selecting a video source for TV 14. The adder 764 is used to insert data from the on-screen display controller 756 into the video signal sent to the television 14.

If no television guide data is contained in the television signal received from the cable or the cable box, then the controller 750 sends a command via the signal line 712 to bit pattern detector 714 or via IR transmitter 762 to switch 700 to switch the FET switch 710 to another television signal source. For example, the FET switch 710 can be switched to antenna 702. When the television signal from antenna 702 is switched to the switch output 728, then the controller 750 can again search through channels received via antenna 702 to find a channel that contains television guide data. If guide data is found, it is then stored in RAM 752 and can be displayed on television 14. The tuner 744 is used to tune to the various channels received via antenna 702. If television guide data is not found in the television signal received via antenna 702, then the controller 750 controls the switch 700 to select the output of satellite receiver 733. The controller 750 along with VBI decoder/slicer 746 or audio decoder 748 determines whether television guide data is received from the satellite receiver 733. The controller 750 can send commands via IR transmitter 762 to IR receiver 735 to command the satellite receiver to various channels in order to search the various channels for television guide data.

Figure 22A:
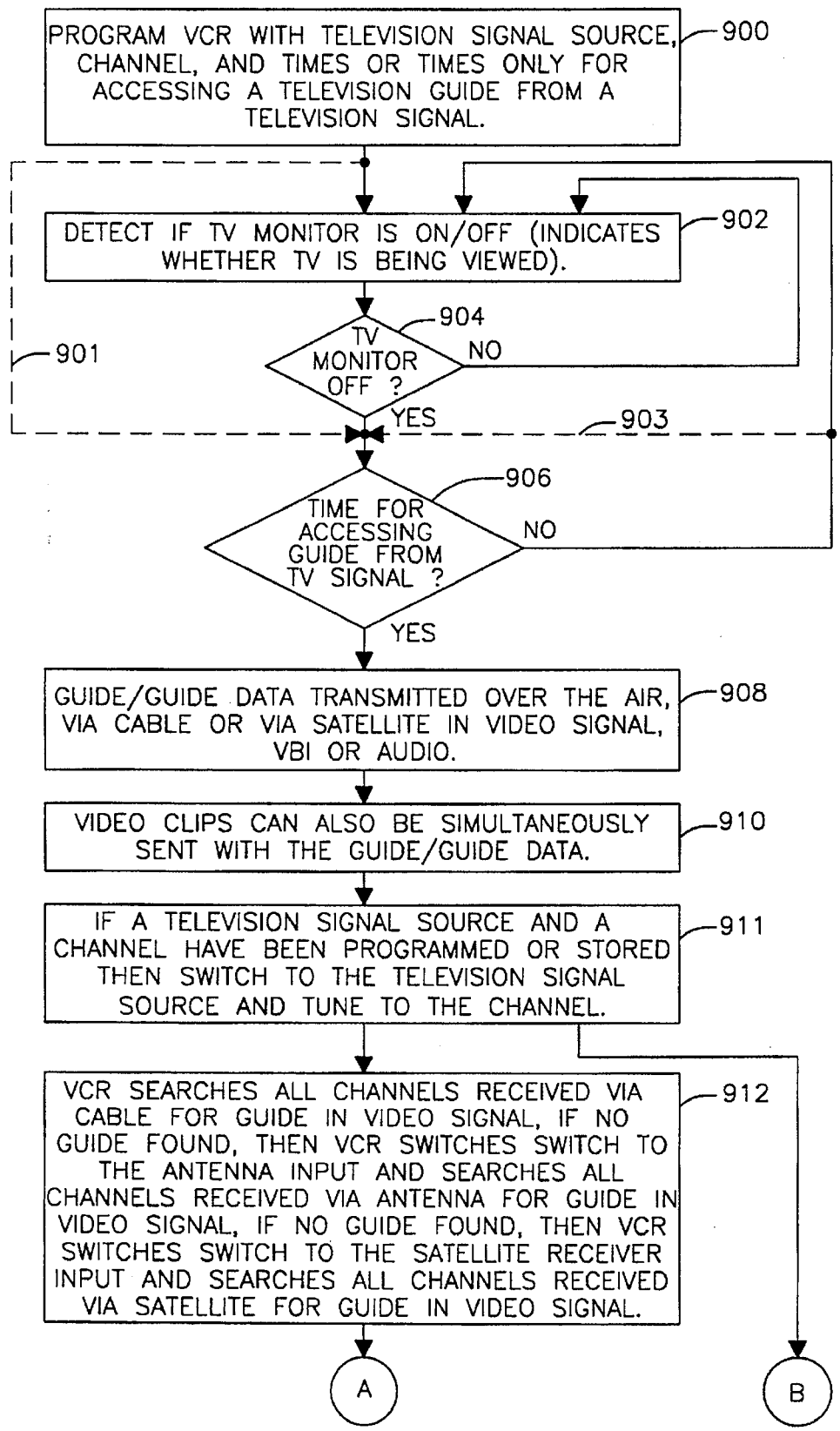
FIGS. 22A and 22B are flow diagrams of a method for searching television signal sources and channels in order to extract a television guide from a television signal according to the present invention.
Figure 22B:
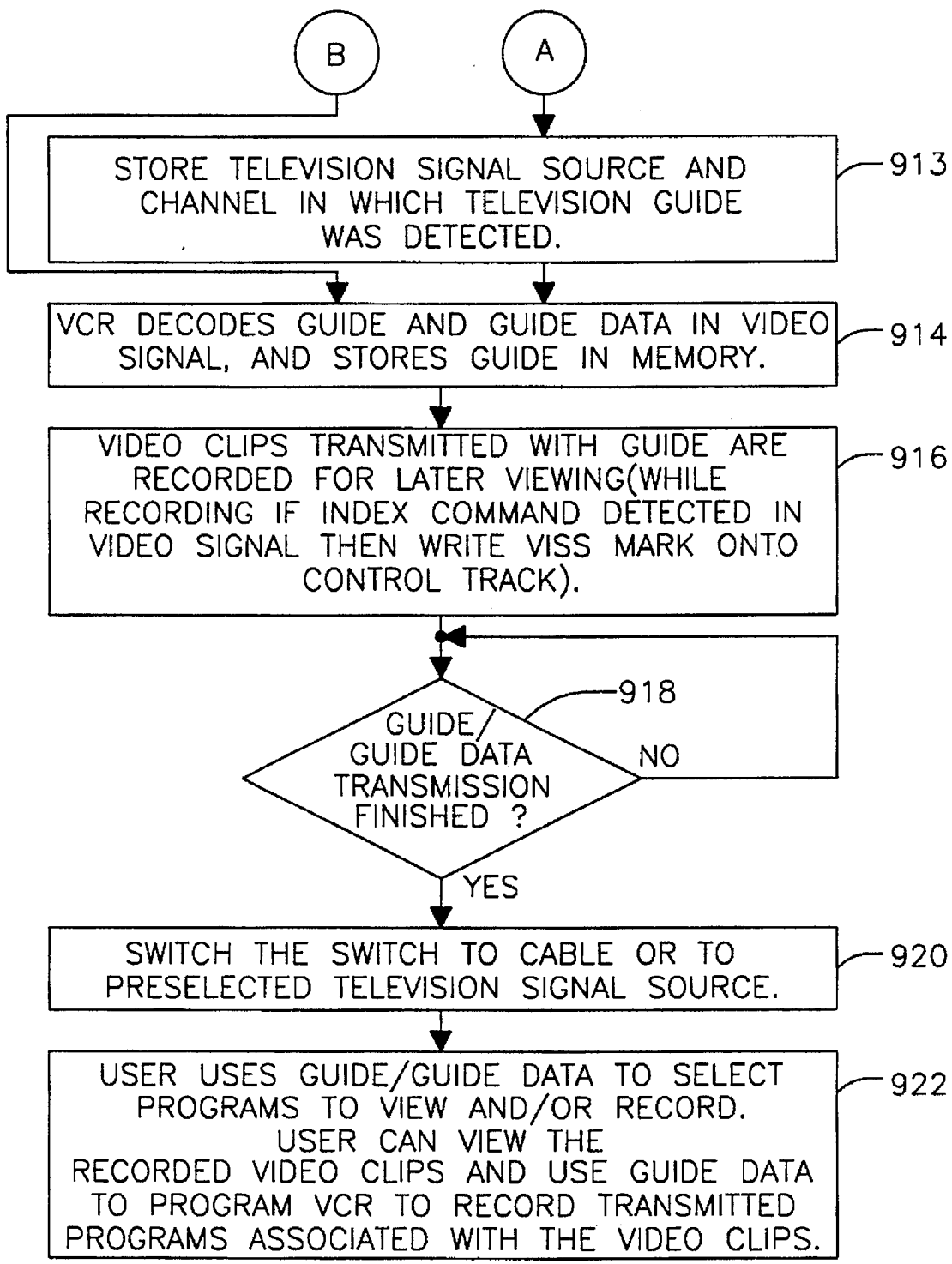

FIGS. 22A and 22B are flow diagrams of a method for accessing a television guide from a television signal. In step 900 a VCR is programmed with a television signal source, a channel and times for accessing a television guide from a television signal or the VCR is programmed with only times for accessing a television guide from a television signal. In step 902 a detector detects whether or not a television monitor is ON or OFF, which indicates whether the TV is being viewed. If in step 904 it is determined that the TV monitor is OFF then in step 906 it is determined whether it is time for accessing a guide from a television signal. If the television monitor is not OFF or if it is not time for accessing a guide, then steps 902 through 906 are repeated until the television monitor is OFF and a time for accessing the guide has arrived. In an alternate embodiment steps 902 and 904 are bypassed and not performed as indicated by lines 901 and 903. In step 908 the guide and guide data are transmitted over the air, via cable, or via satellite and are embedded in the video signal. The guide and guide data can be embedded in the vertical blanking interval or the audio portion of the video signal. In step 910 video clips can also be simultaneously sent with the guide and guide data. The video clips can be previews of selected programs or can contain advertising. Then in step 911 if the television signal source and channel for accessing the guide have been programmed or stored in the VCR then the switch is switched to the specified television signal source and the channel is tuned to. Then in step 914 the VCR decodes the guide and guide data in the video signal and stores the guide and guide data in memory. The television signal source that is programmed or stored in the VCR can be either the cable box, the cable, the over the air antenna or the satellite receiver.

If no television signal source or channel have been programmed or stored in the VCR, then in step 912 the VCR searches all channels received via cable for guide and guide data in a video signal. If no guide is found then the VCR switches the switch to the antenna input and searches all channels received via antenna for the guide and guide data in the video signal. Again if no guide or guide data are found then the VCR switches the switch to the satellite receiver input and searches all channels received via satellite for the guide and the guide data in the video signal. Once a television signal source and a channel have been found with television guide data then in step 913 the television signal source and the channel are stored in the RAM 752 of the VCR 740. Then the next time that a television guide is accessed the stored television signal source and channel can be used to reduce the amount of time required to search for a television signal source and a channel containing television guide data. In step 913, the time for accessing the guide can also be stored. Once television guide data is detected then in step 914 the video signal is decoded to extract the guide and guide data and the guide data are stored in memory.

In step 916 video clips transmitted with the guide are recorded for later viewing. While recording if index commands are detected in the video signal then VISS marks are written onto the control track of the tape. Once the transmission of the guide and guide data is finished as detected in step 918, then in step 920 the switch is switched back to the cable television signal source or to another preselected television signal source, such as the satellite receiver. Then in step 922 the user can use the guide and guide data to select programs to view. The user can also view the recorded video clips and use the guide data to program the VCR to record transmitted programs associated with the video clips.

Figure 23:
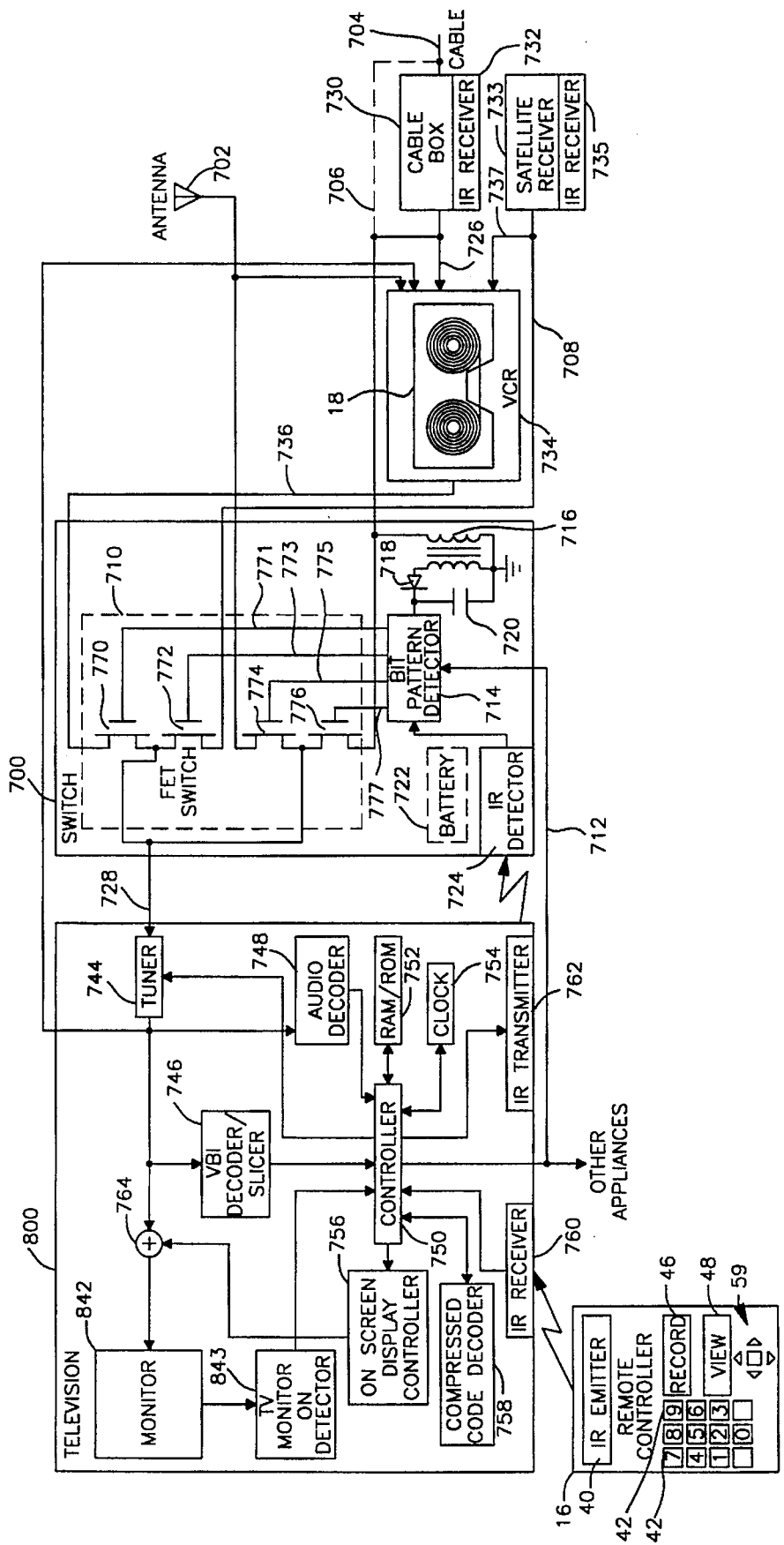
FIG. 23 is a block diagram of a system including a television having apparatus for extracting a television guide from a television signal and for controlling a switch for selecting among television signal sources according to the present invention.

FIG. 23 is an alternate embodiment for accessing a television guide from a television signal. The operation of the embodiment shown in FIG. 23 is similar to the embodiment of FIG. 20 except that in FIG. 23 a television 800 contains the controller 750, the VBI slicer decoder 746, the audio decoder 748, the tuner 744 the RAM/ROM 752, the clock 754 the IR receiver 760, the IR transmitter 762, the compressed code decoder 758 and the on-screen display controller 756. A TV monitor ON detector 843 is coupled to monitor 842 and provides an input to controller 750 to determine whether or not the monitor 842 is ON. This system can contain a VCR 734 which is shown in FIG. 23 as being separate from television 800. The VCR 734 can be commanded by television 800 to record programs or video clips received along with guide and guide data, onto a VCR tape 18. As shown the VCR can be coupled to the cable or cable box output, the over the air antenna 702, the satellite receiver, and can also be coupled to the output of tuner 744.

In order to access a television guide from a television signal, the television 800 operates similarly to VCR 740. The television 800 can store a television signal source, a channel and times for accessing a television guide from a television signal source. The television 800 can command switch 700 to connect the proper television signal source to the tuner 744 and can control tuner 744, cable box 730, and/or satellite receiver 733 in order to select the proper channel for accessing the television guide. The television 800 can also command the switch to select between television signal sources which include over the air antenna 702, cable 704 and satellite receiver 733, and can also command tuner 744, cable box 730, and satellite receiver 733 to tune to various channels in order to search for a channel containing television guide data.

Both VCR 740 and television 800 can contain a compressed code decoder 758 for decoding compressed codes contained in the guide data and obtaining CDTL information for programming a VCR for recording a later broadcast of a program. The method of decoding compressed codes is described above.

Figure 24A:
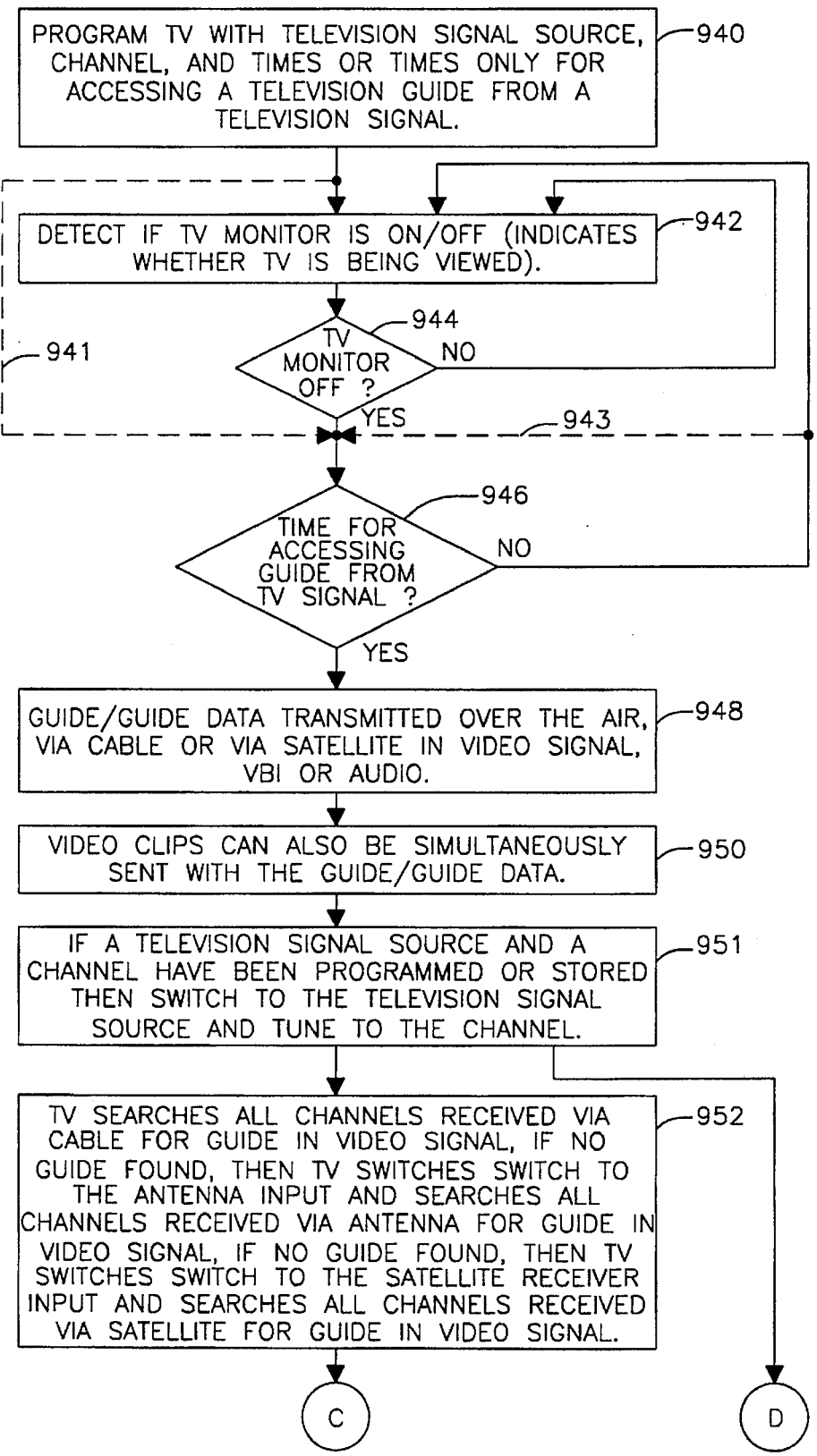
FIGS. 24A and 24B are flow diagrams of a method for controlling a television to search for television guide data between television signal sources and channels in the television signal sources and for controlling the extraction of the television guide data from the television signal source according to the present invention.
Figure 24B:
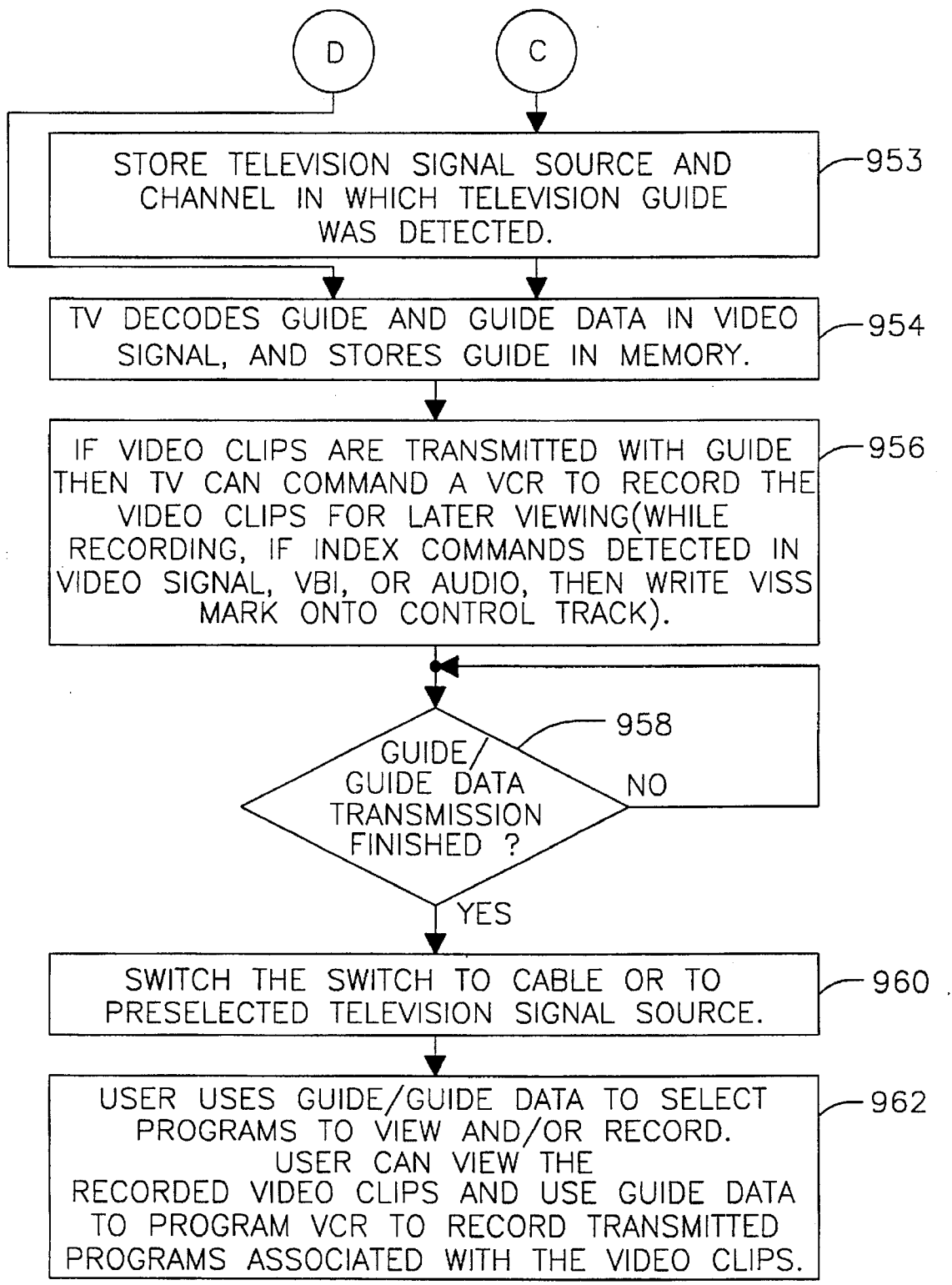

FIGS. 24A and 24B are flow diagrams of a method for accessing a television guide from a television signal. The steps of the method, steps 940–962 are quite similar to steps 900–922 of FIGS. 22A and 22B. The key difference is that the television is programmed with the times or the television source, channel and times for accessing a television guide from a television signal and the TV performs a search for a channel from a television signal source containing a guide rather than a VCR performing the search. The TV also decodes the guide and stores the guide in a memory contained in the television. In step 956 the television can command a VCR to record video clips for later viewing if the video clips are transmitted with the guide.

As noted above, it is possible to embed the switch 700 within the VCR 740 or within the television 800. It is also possible that the functions of the cable box and the satellite receiver be embedded in the VCR 740 or the television 800. It is well known in the art that a television and a VCR can be packaged together.

In another embodiment programs transmitted over the air, via cable, or via satellite and recorded by a VCR on tape can be transmitted with a directory and TPA packets inserted into the vertical blanking interval. The directory and TPA packets in the vertical blanking interval can then be used to access programs recorded on the tape, as further explained below.

Figure 26:
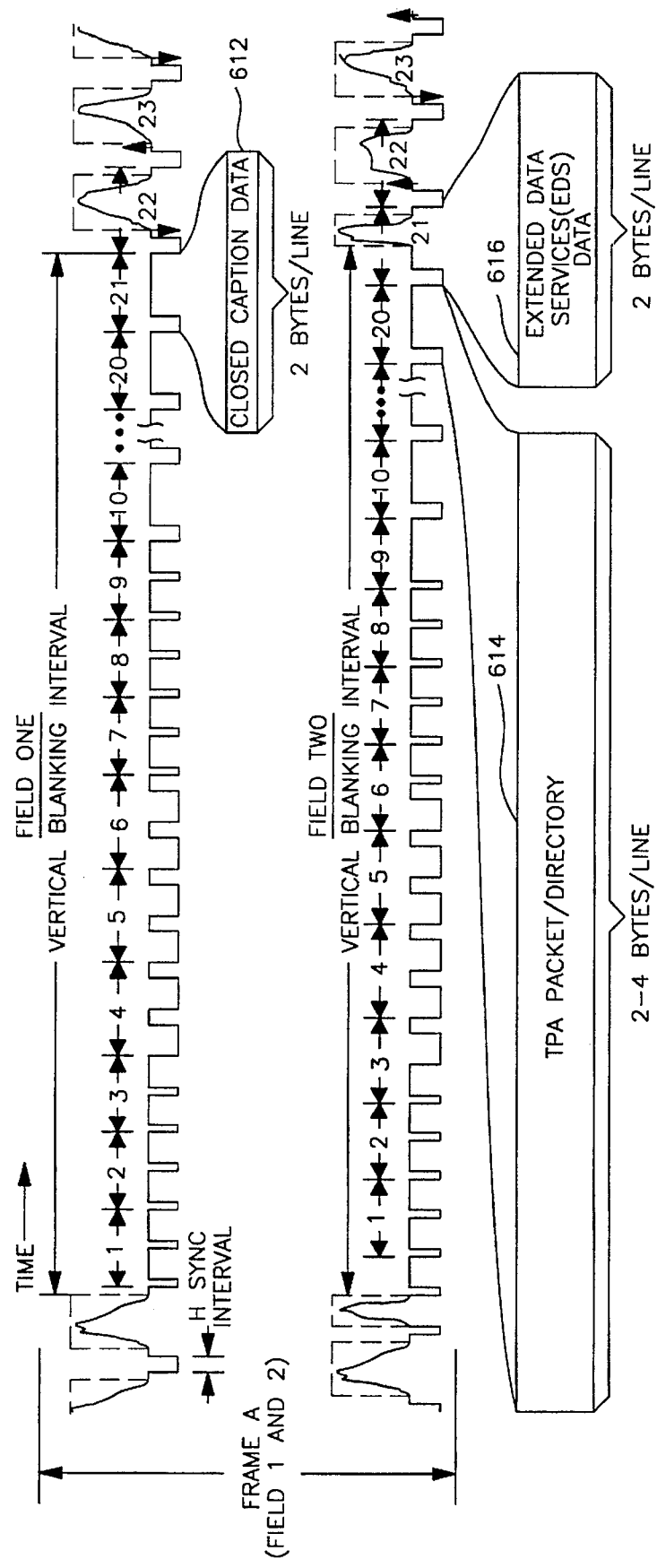
FIG. 26 is a diagram showing a vertical blanking interval line having a TPA packet, containing a tape identification, a program number, and an absolute address, and a directory, which contains a listing of programs according to an embodiment of the present invention.

FIG. 26 is a diagram showing a vertical blanking interval line having a TPA packet, which includes a tape identification, a program number, and an absolute address, and a directory, which contains a listing of programs. The directory may be recorded on a tape in the VBI to provide a directory to the programs on the tape.

Figure 27:
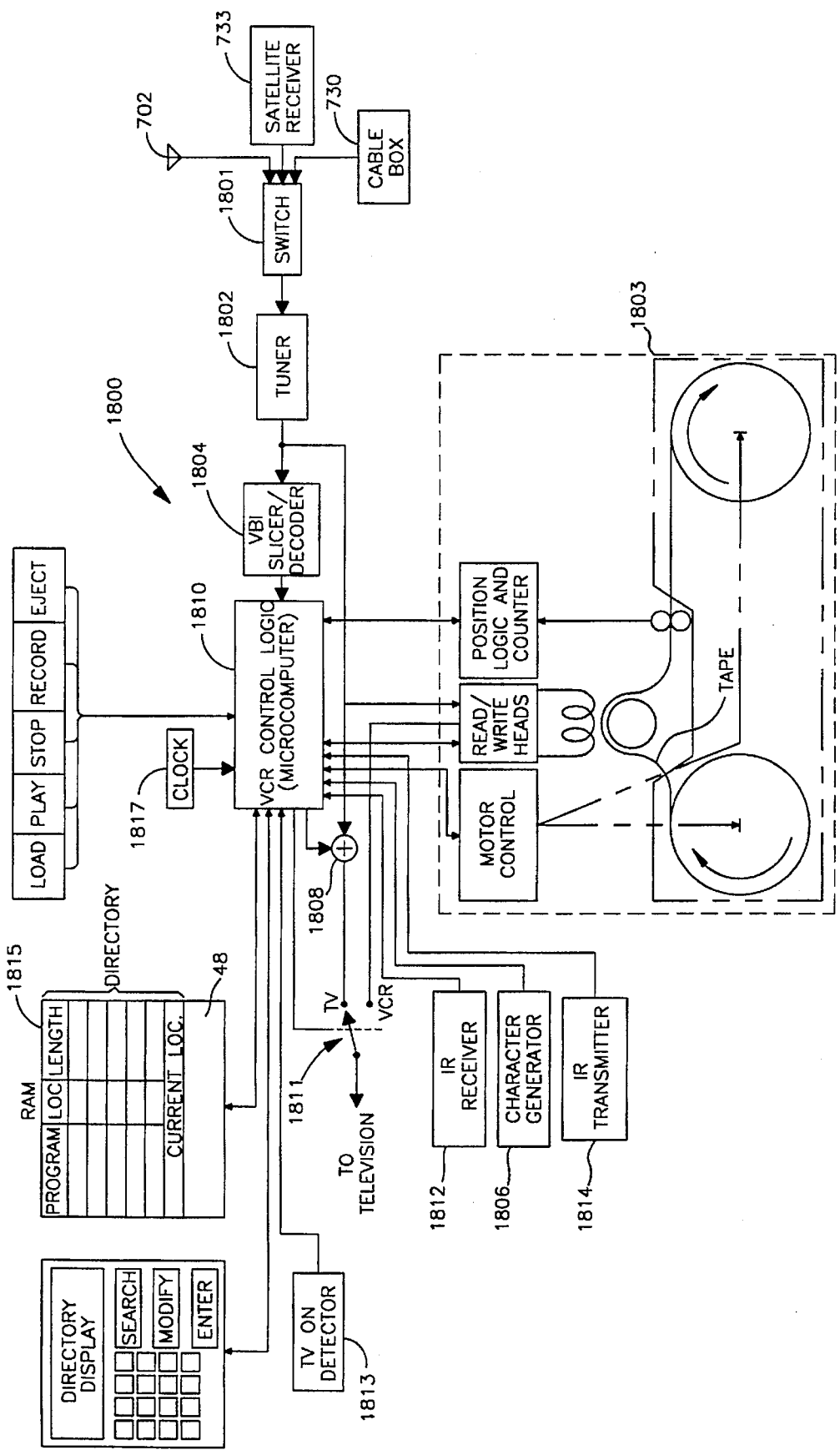
FIG. 27 is a block diagram of a VCR including a vertical blanking interval line decoder, a character generator, a memory for containing a directory of programs stored on a tape, a microcomputer for allowing programs to be accessed on a tape, an infrared receiver, and an infrared transmitter according to an embodiment of the present invention.

FIG. 27 shows a VCR 1800 capable of decoding information in the vertical blanking interval lines received from antenna 702, satellite receiver 733 or cable box 730 via switch 1801. The VCR 1800 shown in FIG. 27 is very similar to the indexing VCR described in patent application Ser. No. 08/176,852, filed Dec. 30, 1993, which is incorporated herein by this reference as though set forth in full. As shown in FIG. 27, the VCR 1800 has a tuner 1802 that can perform the functions of tuner 744 in FIG. 20. A VBI slicer/decoder 1804 is coupled to the output of tuner 1802. A microcomputer 1810, which implements the VCR control logic, receives the output of VBI slicer/decoder 1804. The microcomputer 1810 can control character generator 1806 to provide an on-screen display of information decoded by VBI slicer/decoder 1804 on a television monitor by adding characters to the television signal in adder 1808. The IR transmitter 1814 can be used to control channel selection by cable box 730 and satellite receiver 733. The IR transmitter 1814 can also be implemented as an RF transmitter. The VCR 1800 can implement the method of FIGS. 22A and 22B for accessing and storing a television guide that can be decoded from a television signal. A guide accessed via VBI decoder 1804 can be stored in memory 1815.

The memory 1815 can also be used for storing a directory transmitted in the VBI along with programs recorded by the VCR 1800. The directory and other information such as TPA packets can also be recorded on video cassette tape along with recorded programs to allow a user to conveniently access a particular program recorded on a tape. This is done by using the TPA packets and a directory recorded on a tape as shown in FIG. 28.

Figure 28:
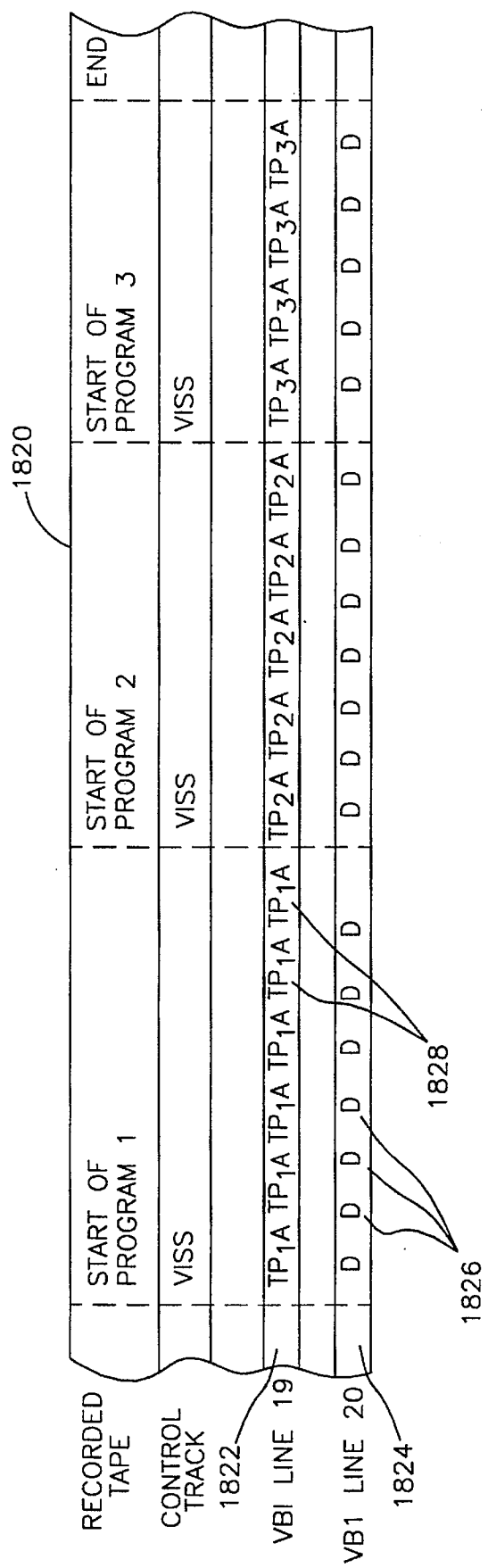
FIG. 28 is a diagram showing a portion of a tape with TPA packets and a directory written in the vertical blanking interval lines according to an embodiment of the present invention.

FIG. 28 shows a portion of a tape 1820 onto which TPA packets have been written in VBI line 19, represented as element 1822, and in which the directory has been written into VBI line 20 of the tape, represented as element 1824. The TPA packets 1828 each contain a tape identification, a program number and an absolute address along the tape. The tape identification is used to identify a directory for the tape in the directory stored in memory 1815. The absolute addresses recorded along the tape are times from the beginning of the tape and can to used to derive start and end addresses for programs recorded on the tape. The start and end addresses can be stored in the directory in memory 1815. The directory 1826, which is recorded along the tape, also contains a directory of all of the programs on the tape. The user accesses a program by selecting one from either the directory in memory 1815 or the directory recorded on the tape and then the indexing VCR 1800 can automatically access the beginning of the program by using start addresses in the directory and comparing the start address to the absolute address in the TPA packets recorded along the tape until an absolute address is found that compares to the start address. Then the program can be played until an absolute address in a TPA packet compares to the end address in the directory for the program.

Figure 29A:
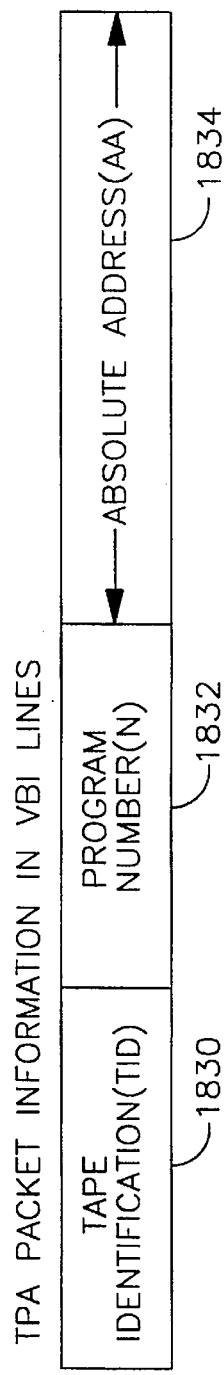
FIG. 29A is a diagram showing the format of a TPA packet comprising a tape identification field, a program number field and a absolute address field according to an embodiment of the present invention.
Figure 29B:
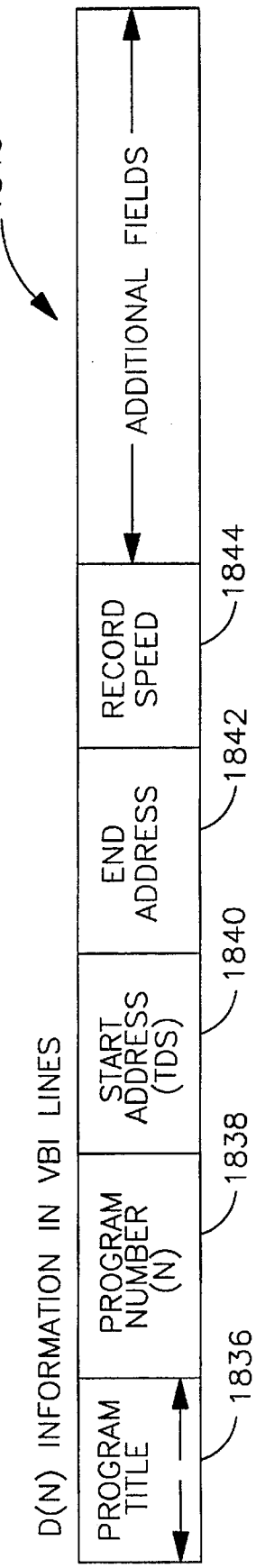
FIG. 29B is a diagram showing the format of a directory written in vertical blanking interval lines comprising a program title, a program number, a start address, an end address, the record speed, and additional fields for other information such as a program description according to an embodiment of the present invention.

FIG. 29A shows a diagram of the format of a TPA packet recorded in the vertical blanking interval lines. The TPA packet contains a tape identification 1830, a program number 1832, and an absolute address 1834. FIG. 29B shows the information that is contained in a directory in the VBI lines. The directory contains a program title 1836, a program number 1838, a start address 1840 along the tape for the program, and an end address 1842, a record speed 1844, and additional fields 1846, which can contain, for example, a short description of the program. The method for using TPA packets and a directory for allowing a user to conveniently access a program along a tape is further described in patent application Ser. No. 08/167,185, filed Dec. 15, 1993, which is incorporated herein by this reference as though set forth in full.

The VCR 1800 can use clock 1817 to determine when to record transmitted programs that contain a directory and TPA packets according to a time programmed into the VCR 1800 for recording the transmitted programs. The VCR 1800 can also be programmed with the channel and television signal source for recording the program. Alternately, the VCR control logic 1810 can control switch 1801, tuner 1802 and tuners in the cable box 730 and the satellite receiver 733, in order to search the television signal sources and channels for each television signal source for a programs being transmitted that include a directory and TPA packets, in a manner similar to step 912 of FIG. 22A.

The VCR 1800 has a TV ON detector 1813 that can be used to detect whether the TV is ON, and the VCR 1800 can use this detector to implement steps 902 and 904 of FIG. 22A. In general, the VCR 1800 can perform all of the steps shown ill FIGS. 22A and 22B to search for and store a guide. By substituting searching for and storing a directory rather than the guide called out in FIGS. 22A and 22B the VCR 1800 can use the methods of FIGS. 22A and 22B to search for a transmission of a directory and store the directory.

Figure 30:
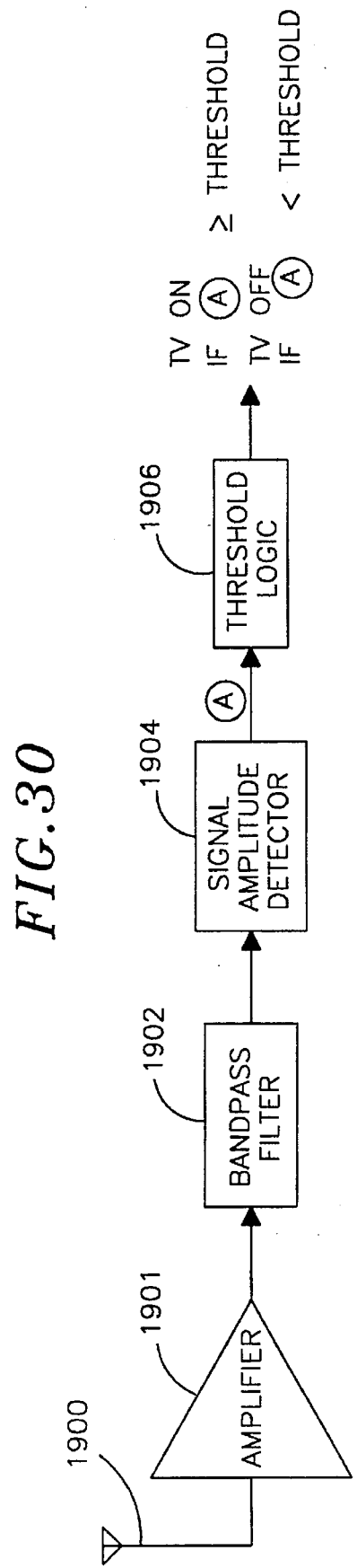
FIG. 30 is a block diagram showing a television ON detector according to an embodiment of the present invention.

FIG. 30 is a block diagram showing a television ON detector that can be used for implementing television ON detectors 763, 843, and 1813. An antenna 1900 is used to detect electromagnetic radiation from the tube of a television. The signal, which can be the frequency of the electromagnetic radiation from the television tube sweep rates and other frequencies generated by the television tube, is amplified by amplifier 1901 and then further amplified by bandpass filter 1902. Then signal amplitude detector 1904 detects the amplitude of the signal. If the signal passes a threshold set by the threshold logic, then it is determined that the television is ON. Otherwise the television ON detector indicates that the television is OFF.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed:

1. An apparatus for deriving a television guide, the apparatus comprising:
    means for generating a signal representative of electromagnetic radiation from the picture tube of a television;
    means for detecting the amplitude of the signal;
    means for comparing the amplitude of the signal to a predetermined threshold value above which the television is turned on;
    means for coupling a first television signal source to a signal output;
    means for determining whether television guide data is contained in the signal output at a given time;
    means for switching the signal output from the first television signal source to a second television signal source, if television guide data is not contained in the signal output from the first television signal source at the given time;
    means responsive to the comparing means for extracting the television guide data from the signal output at the given time when the television is turned off; and
    means for storing the extracted television guide data.

2. The apparatus of claim 1, in which the generating means comprises an antenna.

3. The apparatus of claim 2, in which the generating means additionally comprises an amplifier and a bandpass filter coupled to the amplifier, the bandpass filter being designed to pass the frequency of electromagnetic radiation from the picture tube.

4. The apparatus of claim 1, additionally comprising means for filtering the signal before detection so the signal occupies the frequency band of electromagnetic radiation from the picture tube.

5. The apparatus of claim 4, in which the signal occupies the frequency band of the television tube sweep.

6. The apparatus of claim 1, additionally comprising a television tuner that forms the signal output.

7. The apparatus of claim 6, in which the switching means comprises a switch alternatively coupling the first and second sources to the tuner.

8. A method for deriving a television program guide from television guide data transmitted with a television signal, the method comprising the steps of:
    detecting electromagnetic radiation from a picture tube of a television;
    producing from the detected electromagnetic radiation a control signal representative of its amplitude;
    comparing the control signal with a predetermined threshold value to determine if the television is on or off, the television being on if the control signal exceeds the threshold value and the television being off if the threshold value exceeds the control signal;

determining whether television guide data is contained in a signal output at a given time;

extracting the television guide data from the signal output at the given time when the threshold value exceeds the control signal;

coupling a first television signal source to the signal output;

switching the signal output from the first television signal source to a second television signal source, if television guide data is not contained in the signal output from the first television signal source at the given time; and storing the extracted television guide data.

9. The method of claim 8, in which the detecting step comprises placing an antenna in the vicinity of the picture tube to intercept part of the radiation therefrom and filtering the intercepted radiation to form the control signal from one or more frequencies generated by the picture tube.

10. The method of claim 9, in which the filtering step forms the control signal from the tube sweep radiation.

* * * * *